US012460769B2

(12) United States Patent
Glickstein et al.

(10) Patent No.: US 12,460,769 B2
(45) Date of Patent: **\*Nov. 4, 2025**

(54) ADJUSTABLE SUPPORT ARM

(71) Applicant: Humanscale Corporation, New York, NY (US)

(72) Inventors: Jacob Glickstein, Golden Valley, MN (US); Steve Bender, Fairfield, CT (US); Ross Velazquez, Brooklyn, NY (US); Travis Yoch, Woodbury, MN (US)

(73) Assignee: Humanscale Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,385

(22) Filed: Jun. 23, 2023

(65) Prior Publication Data

US 2023/0332738 A1    Oct. 19, 2023

Related U.S. Application Data

(63) Continuation of application No. 17/974,737, filed on Oct. 27, 2022, now Pat. No. 11,867,355, which is a
(Continued)

(51) Int. Cl.
*F16M 13/02* (2006.01)
*F16M 11/20* (2006.01)
*F16M 11/26* (2006.01)

(52) U.S. Cl.
CPC ...... *F16M 13/022* (2013.01); *F16M 11/2014* (2013.01); *F16M 11/26* (2013.01); *F16M 11/2092* (2013.01)

(58) Field of Classification Search
CPC .. F16M 13/022; F16M 11/2014; F16M 11/26; F16M 11/2092
(Continued)

(56) References Cited

U.S. PATENT DOCUMENTS 1,460,697 A    7/1923    Bendlin
2,081,677 A    5/1937    O'Neill
(Continued)

FOREIGN PATENT DOCUMENTS

CN    2873564 Y    2/2007
CN    10730009 A    10/2017
(Continued)

OTHER PUBLICATIONS

International Search Report and Written Opinion dated Jul. 15, 2011, PCT Application No. PCT/US2011/033408, International Filing date of Apr. 21, 2011.
(Continued)

*Primary Examiner* — Todd M Epps
(74) *Attorney, Agent, or Firm* — Jones Walker LLP

(57) ABSTRACT

An adjustable support arm capable of providing users with a wide range of height, depth, tilt, and swivel options. The adjustable support arm may comprise an arm assembly releasably mounted to a base assembly. In further embodiments, the adjustable support arm may also comprise an articulating joint connected to the arm assembly, and an accessory bracket assembly connected to the articulating joint. A quick-release joint comprising a spring-loaded pivot latch may be utilized to releasably connect the arm assembly to the base assembly. To dampen side-to-side movement of the arm assembly, the adjustable support arm may also comprise a friction cartridge assembly comprising a taper-lock bushing and one or more set screws. A ring-shaped, adjustable panning insert can be coupled to the arm assembly to restrict the range of side-to-side motion of the support arm. The adjustable arm can further comprise a quick-release accessory fastening mechanism for easy removal and attachment of a mounted object (e.g., an electronic display, keyboard, or other item) to the support arm.

20 Claims, 29 Drawing Sheets

Related U.S. Application Data continuation of application No. 17/107,234, filed on Nov. 30, 2020, now Pat. No. 11,486,537, which is a continuation of application No. 15/943,437, filed on Apr. 2, 2018, now Pat. No. 10,851,938.

(58) Field of Classification Search
USPC .................................................... 248/278.1
See application file for complete search history.

(56) References Cited

U.S. PATENT DOCUMENTS

| | | |
|---|---|---|
| 2,700,524 A | 1/1955 | Lauterbach |
| 3,297,291 A | 1/1967 | Everett |
| 4,039,818 A | 8/1977 | Hickman |
| 4,082,244 A | 4/1978 | Groff |
| 4,143,652 A | 3/1979 | Meier et al. |
| 4,266,747 A | 5/1981 | Souder, Jr. et al. |
| 4,516,751 A | 5/1985 | Westbrook |
| 4,521,057 A | 6/1985 | Varterasion |
| 4,695,024 A | 9/1987 | Haven |
| 4,770,384 A | 9/1988 | Kuwazima et al. |
| 4,836,494 A | 6/1989 | Johnsen |
| 4,844,387 A | 7/1989 | Sorgi et al. |
| 4,846,434 A | 7/1989 | Krogsrud |
| 4,852,500 A | 8/1989 | Ryburg et al. |
| 5,277,392 A | 1/1994 | Rossman et al. |
| 5,358,352 A | 10/1994 | Klarhorst |
| 5,687,939 A | 11/1997 | Moscovitch |
| 5,720,369 A | 2/1998 | Thorn |
| 5,743,503 A | 4/1998 | Voeller et al. |
| 5,826,846 A * | 10/1998 | Buccieri ............ F16M 11/2014 |
| | | 248/278.1 |
| 5,860,628 A | 1/1999 | Miani et al. |
| 5,888,190 A * | 3/1999 | Meyer ................ F16M 11/2014 |
| | | 248/278.1 |
| 5,971,348 A | 10/1999 | Thomas |
| 5,975,472 A | 11/1999 | Hung |
| 5,992,809 A | 11/1999 | Sweere et al. |
| 6,010,017 A | 1/2000 | Michaelis et al. |
| 6,012,693 A | 1/2000 | Voeller et al. |
| 6,076,785 A | 6/2000 | Oddsen, Jr. |
| 6,149,253 A | 11/2000 | Talasani |
| RE36,978 E | 12/2000 | Moscovitch |
| 6,189,849 B1 | 2/2001 | Sweere et al. |
| 6,390,433 B1 | 5/2002 | Kasa-Dujukic |
| 6,419,196 B1 | 7/2002 | Sweere et al. |
| 6,481,675 B1 | 11/2002 | Yoon |
| 6,505,988 B1 | 1/2003 | Oddsen, Jr. |
| 6,695,270 B1 | 2/2004 | Smed |
| 6,736,364 B2 | 5/2004 | Oddsen, Jr. |
| 6,769,657 B1 | 8/2004 | Huang |
| 6,783,105 B2 | 8/2004 | Oddsen, Jr. |
| 6,854,698 B2 | 2/2005 | Oddsen, Jr. |
| 6,857,610 B1 | 2/2005 | Conner et al. |
| 6,863,252 B2 | 3/2005 | Bosson |
| 6,915,995 B2 | 7/2005 | Oddsen, Jr. |
| 6,935,883 B2 | 8/2005 | Oddsen, Jr. |
| 6,994,306 B1 | 2/2006 | Sweere et al. |
| 7,014,157 B2 | 3/2006 | Oddsen |
| 7,044,423 B2 | 5/2006 | Bober et al. |
| 7,048,242 B2 | 5/2006 | Oddsen, Jr. |
| 7,063,296 B2 | 6/2006 | Williams |
| 7,096,560 B2 | 8/2006 | Oddsen, Jr. |
| 7,100,880 B2 | 9/2006 | Oddsen, Jr. |
| 7,168,665 B2 | 1/2007 | Hong et al. |
| D537,323 S | 2/2007 | Saez |
| 7,195,214 B2 | 3/2007 | Lee et al. |
| 7,207,537 B2 | 4/2007 | Hung |
| 7,246,780 B2 | 7/2007 | Oddsen, Jr. |
| 7,252,277 B2 | 8/2007 | Sweere et al. |
| 7,389,965 B2 | 6/2008 | Oddsen, Jr. |
| 7,395,995 B2 | 7/2008 | Chen |
| 7,398,950 B2 | 7/2008 | Hung |
| 7,510,155 B2 | 3/2009 | Huang et al. |
| 7,540,457 B2 | 6/2009 | Oddsen et al. |
| 7,546,994 B2 | 6/2009 | Altonji et al. |
| 7,562,851 B2 | 7/2009 | Hein et al. |
| 7,600,728 B2 | 10/2009 | Petrick et al. |
| 7,644,898 B2 | 1/2010 | White et al. |
| 7,703,733 B2 | 4/2010 | Price et al. |
| 7,726,616 B2 | 6/2010 | Zhang et al. |
| 7,748,666 B2 | 7/2010 | Oddsen et al. |
| 7,810,773 B2 | 10/2010 | Chi |
| 8,011,632 B2 | 9/2011 | Wang et al. |
| 8,074,949 B2 | 12/2011 | Oddsen, Jr. et al. |
| 8,585,001 B2 | 11/2013 | Huang |
| 8,794,579 B2 | 8/2014 | Sturman et al. |
| 9,657,889 B1 | 5/2017 | Chumakov |
| 10,066,785 B1 | 9/2018 | Chen et al. |
| D849,013 S | 5/2019 | Monsalve et al. |
| 10,851,938 B2 * | 12/2020 | Glickstein ............ F16M 11/16 |
| 11,486,537 B2 * | 11/2022 | Glickstein ............ F16M 13/022 |
| 11,857,355 B2 * | 1/2024 | Li ........................ A61B 6/482 |
| 11,867,355 B2 * | 1/2024 | Glickstein .......... F16M 11/2014 |
| 2002/0011544 A1 | 1/2002 | Bosson |
| 2002/0015296 A1 | 2/2002 | Howell et al. |
| 2002/0088910 A1 | 7/2002 | Sweere et al. |
| 2003/0001056 A1 | 1/2003 | Ihalainen et al. |
| 2003/0024144 A1 | 2/2003 | Jen |
| 2003/0132356 A1 | 7/2003 | Copeland |
| 2003/0141425 A1 | 7/2003 | Obdeijn |
| 2004/0011932 A1 | 1/2004 | Duff |
| 2004/0031893 A1 | 2/2004 | Smed |
| 2004/0262474 A1 | 12/2004 | Boks et al. |
| 2005/0023422 A1 | 2/2005 | Oddsen |
| 2005/0121578 A1 | 6/2005 | Asamaru et al. |
| 2005/0184215 A1 | 8/2005 | Lin |
| 2006/0076463 A1 | 4/2006 | Drew |
| 2006/0118686 A1 | 6/2006 | Hsieh et al. |
| 2006/0157627 A1 | 7/2006 | Hung |
| 2007/0040084 A1 | 2/2007 | Sturman et al. |
| 2007/0045488 A1 | 3/2007 | Shin |
| 2007/0069565 A1 | 3/2007 | Diffrient |
| 2007/0086155 A1 | 4/2007 | Chen et al. |
| 2007/0102596 A1 | 5/2007 | Sung |
| 2007/0108355 A1 | 5/2007 | Li |
| 2007/0228234 A1 | 10/2007 | Doyle |
| 2008/0029661 A1 | 2/2008 | Chen |
| 2008/0094792 A1 | 4/2008 | Chen et al. |
| 2008/0164395 A1 | 7/2008 | Chang et al. |
| 2010/0123053 A1 | 5/2010 | Wang |
| 2010/0127144 A1 | 5/2010 | Lange |
| 2010/0308185 A1 | 12/2010 | Huang |
| 2011/0147546 A1 * | 6/2011 | Monsalve .......... F16M 11/2014 |
| | | 248/122.1 |
| 2011/0260017 A1 | 10/2011 | Monsalve |
| 2011/0315843 A1 | 12/2011 | Hung |
| 2012/0228454 A1 | 9/2012 | Kroenung |
| 2013/0161465 A1 | 6/2013 | Huang |
| 2013/0284871 A1 | 10/2013 | Huang |
| 2015/0041605 A1 | 2/2015 | Nam |
| 2015/0366627 A1 * | 12/2015 | Oginski ............... F16M 13/027 |
| | | 403/112 |
| 2015/0377283 A1 | 12/2015 | Oginski |
| 2016/0102802 A1 | 4/2016 | Oginski |

FOREIGN PATENT DOCUMENTS

| | | |
|---|---|---|
| DE | 29908098 U1 | 7/1999 |
| DE | 20201700098 U1 | 3/2017 |
| GB | 2294632 A | 5/1996 |
| TW | M556811 U | 3/2018 |
| WO | 8502524 A1 | 6/1985 |
| WO | 2011133757 A1 | 10/2011 |
| WO | 2014072719 A1 | 5/2014 |
| WO | 2017086783 A1 | 5/2017 |
| WO | 2018141000 A1 | 8/2018 |

OTHER PUBLICATIONS

International Search Report and Written Opinion dated Jun. 21, 2019, PCT Application No. PCT/US2019/24788, International Filing date of Mar. 29, 2019.

(56) References Cited

OTHER PUBLICATIONS

EPO, European Search Report, Application No. 19781080.7, Nov. 4, 2021, 6 pages.
CNIPA Application No. 202210595735.8 ( Adjustable Support Arm)—Examiner's Action dated Mar. 8, 2024.
EPO, European Search Report, Application No. 24181672.7, Sep. 26, 2024.

\* cited by examiner

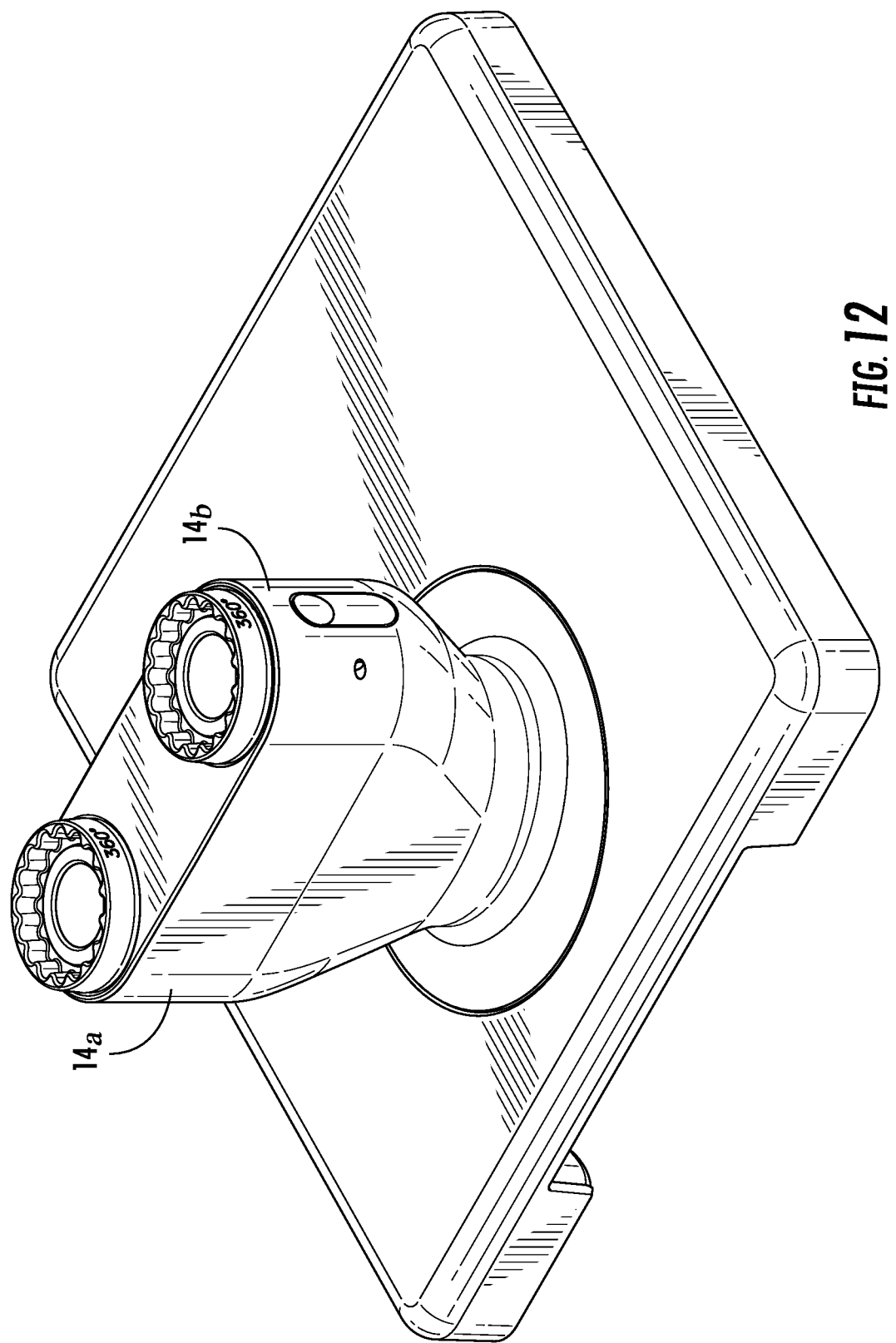

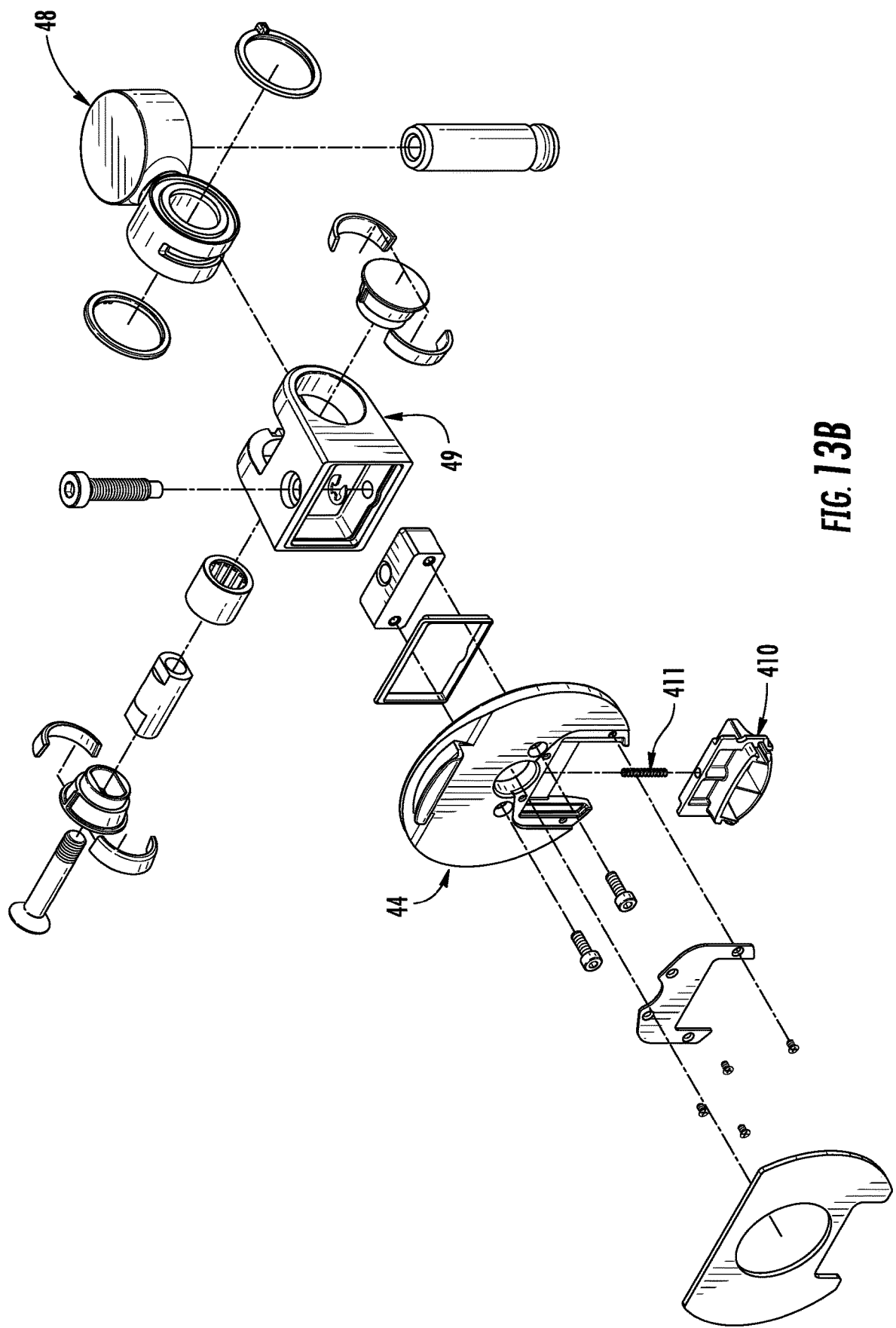

ADJUSTABLE SUPPORT ARM

CROSS-REFERENCE TO RELATED APPLICATIONS

This application is a continuation of U.S. application Ser. No. 17/974,737 filed on Oct. 27, 2022, which is a continuation of U.S. application Ser. No. 17/107,234 filed on Nov. 30, 2020 and issued as U.S. Pat. No. 11,486,537 on Nov. 1, 2022, which is a continuation of U.S. application Ser. No. 15/943,437 filed on Apr. 2, 2018 and issued as U.S. Pat. No. 10,851,938 on Dec. 1, 2020, each of which are incorporated by reference herein in their entirety.

BACKGROUND OF THE INVENTION

Adjustable support arms allow mounted objects such as electronic displays, keyboards, or other items to be moved to the appropriate ergonomic position relative to the user. By enabling users to align the monitor at the correct height for them, adjustable support arms encourage a healthier, more ergonomic working posture which helps prevent eye and neck strain. Additionally, they preserve precious workspace by floating the monitor above the user's work surface.

In today's modern workplace, adjustable support arms must provide users with a wide range of height, depth, and angle adjustments. For example, when changing from a seated position to a standing position at height-adjustable desks, users oftentimes will desire that the monitor, keyboard and other equipment be at adjusted to different positions. Similarly, where the concept of hot-desking is employed in the workplace, a given workstation must be capable of accommodating different users of different sizes throughout the workday. Accordingly, an adjustable support arm offering improved adjustability over a wide range of travel would be beneficial.

SUMMARY OF THE INVENTION

The invention disclosed herein is generally directed to an adjustable support arm capable of providing users with a wide range of height, depth, tilt, and swivel options for the side-to-side, front-to-back, and up-to-down movements that the modern workspace requires. An adjustable support arm exemplifying the principles of the present invention can comprise one or more of the following features: a quick-release joint for enabling easy removal and attachment of the arm assembly to the base assembly; a friction cartridge assembly for connecting the arm assembly to the base assembly in a manner which reduces slack in the joint; an adjustable panning insert for adjusting the side-to-side range of motion of the support arm; a bearing positioned in the hub of the base assembly for reducing the amount of force required to adjust the side-to-side motion of the support arm as well as the amount of force required to detach the arm assembly from the base assembly; a quick-release accessory fastening mechanism for easy removal and attachment of a mounted accessory (e.g., an electronic display, keyboard, or other object) to the support arm; and an accessory bracket assembly for mounting both primary and secondary accessories to the adjustable support arm.

In an embodiment exemplifying the principles of the invention, the adjustable support arm can comprise an arm assembly releasably mounted to a base assembly. The adjustable support arm optionally may also comprise an articulating joint connected to the arm assembly, and an accessory bracket assembly connected to the articulating joint.

In a further embodiment exemplifying the principles of the invention, the adjustable support arm may also comprise a quick-release joint for releasably connect the arm assembly to the base assembly. The quick-release joint may comprise a spring-loaded latch coupled to the base assembly which releasably engages an indentation in a connector shaft secured to the arm assembly, thus locking the arm assembly into connection with the base assembly. In embodiments whereby the arm assembly comprises a first arm mounted to a second arm, a quick-release joint may also be utilized to releasably connect the arms.

In another embodiment exemplifying the principles of the invention, the adjustable support arm may also include a friction cartridge assembly for dampening side-to-side movement of the arm assembly and reducing slack in the joints. The friction cartridge assembly may comprise a taper-lock bushing surrounding a portion of the connector shaft. Set screws positioned adjacent to the taper-lock bushing can be utilized to cause the taper-lock bushing to deflect inward towards the connector shaft as the set screws are driven inward, thus increasing the friction between the connector shaft and the taper-lock bushing and, in turn, dampening the side-to-side movement of the arm assembly.

In yet another embodiment exemplifying the principles of the invention, the adjustable support arm may also include a ring-shaped, adjustable panning insert coupled to the arm assembly for restricting the range of side-to-side motion of the support arm. The adjustable panning insert can comprise first and second male splines positioned in a stacked orientation around the inner wall of the adjustable panning insert. The adjustable panning insert also includes first and second projections positioned in a spaced relation around the circumference of the adjustable panning insert and extending in the vertical plane. In operation, a user can elect the preferred range of side-to-side motion of the support arm by adjusting the orientation of the adjustable panning insert relative to its housing formed in the base assembly and/or the first arm. By having the first projection spaced apart from the second projection along the circumference of the adjustable panning insert, a user will have three swivel settings (e.g., 90°, 180°, and 360° rotation) based upon the adjustable panning insert's orientation in the housing.

In yet another embodiment exemplifying the principles of the invention, the adjustable support arm may also include a quick-release accessory fastening mechanism for easy removal and attachment of an accessory (e.g., an electronic display, keyboard, or other object) to the adjustable support arm. The accessory fastening mechanism can comprise spring-loaded latch and a hook. An accessory can be secured to the support arm by first coupling the hook to the upper portion of the accessory's mounting bracket and then coupling the spring-loaded latch to the lower portion of the accessory's mounting bracket.

In yet another embodiment exemplifying the principles of the invention, the adjustable support arm may also include an accessory bracket assembly having tubular mounts for attaching secondary accessories to the adjustable support arm. One or more accessory brackets can be coupled to the tubular mount(s) to provide a frame for mounting secondary accessories such as paper holders, lights, and the like.

The above summary is not intended to describe each embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various exemplary embodiments and to explain various principles and advantages in accordance with the present invention:

FIG. 12 is a perspective view of an alternative embodiment of the base assembly suitable for use with the adjustable support arm of the present invention;

FIG. 13B is an exploded view of an alternative embodiment of the articulating joint suitable depicted in FIG. 13A;

DETAILED DESCRIPTION OF THE INVENTION

Figure 1:
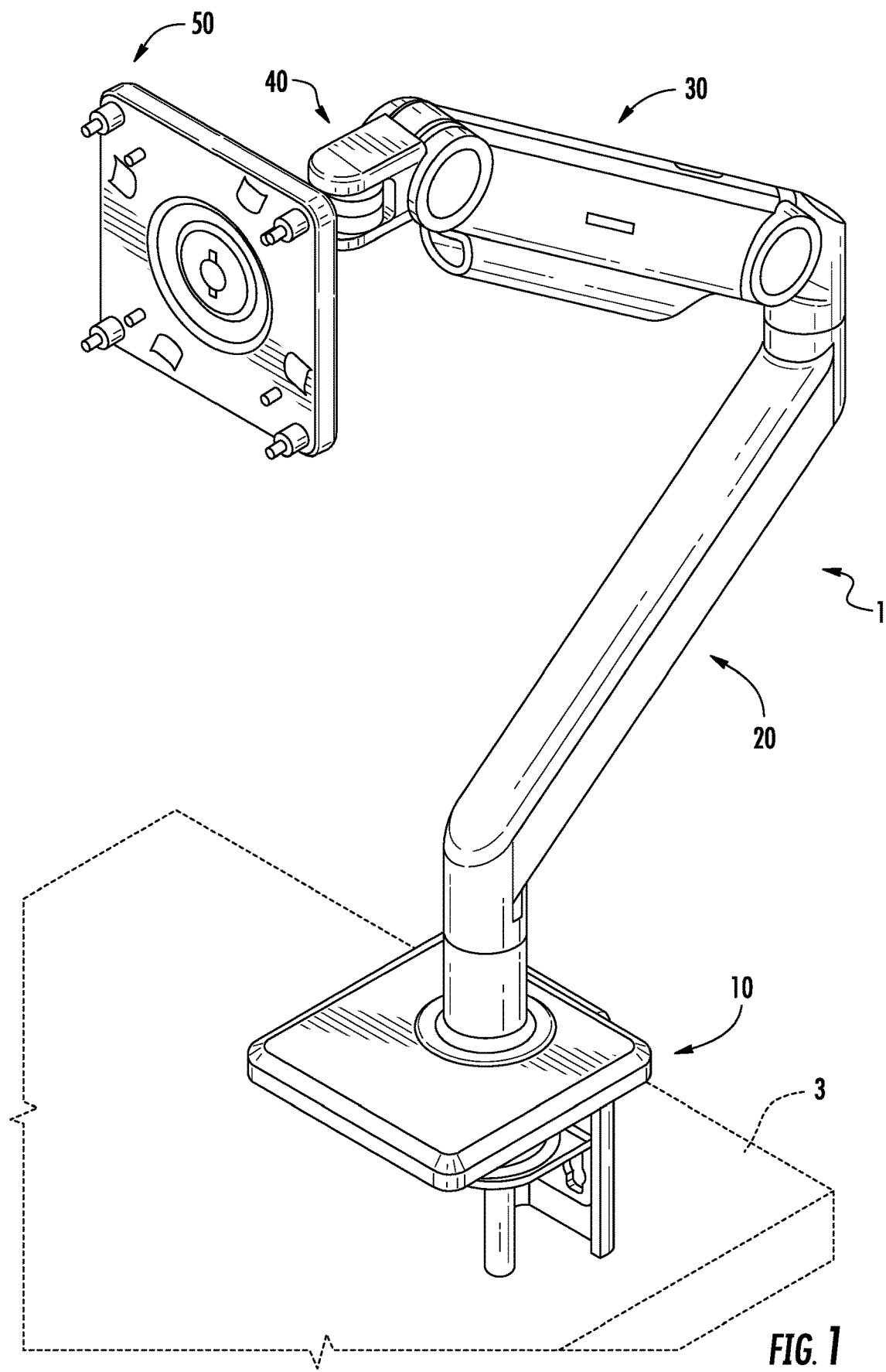
FIG. 1 is a front perspective view of an exemplary embodiment of an adjustable support arm of the present invention.

Detailed embodiments of the present invention are disclosed herein. However, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Alternate embodiments may be devised without departing from the spirit or the scope of the invention. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more. The term "plurality," as used herein, is defined as two or more. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, upper and lower, top and bottom, right and left, and the like may be used solely to distinguish one entity or action from another entity or action without necessarily requiring or implying any actual such relationship or order between such entities or actions.

Figure 2:
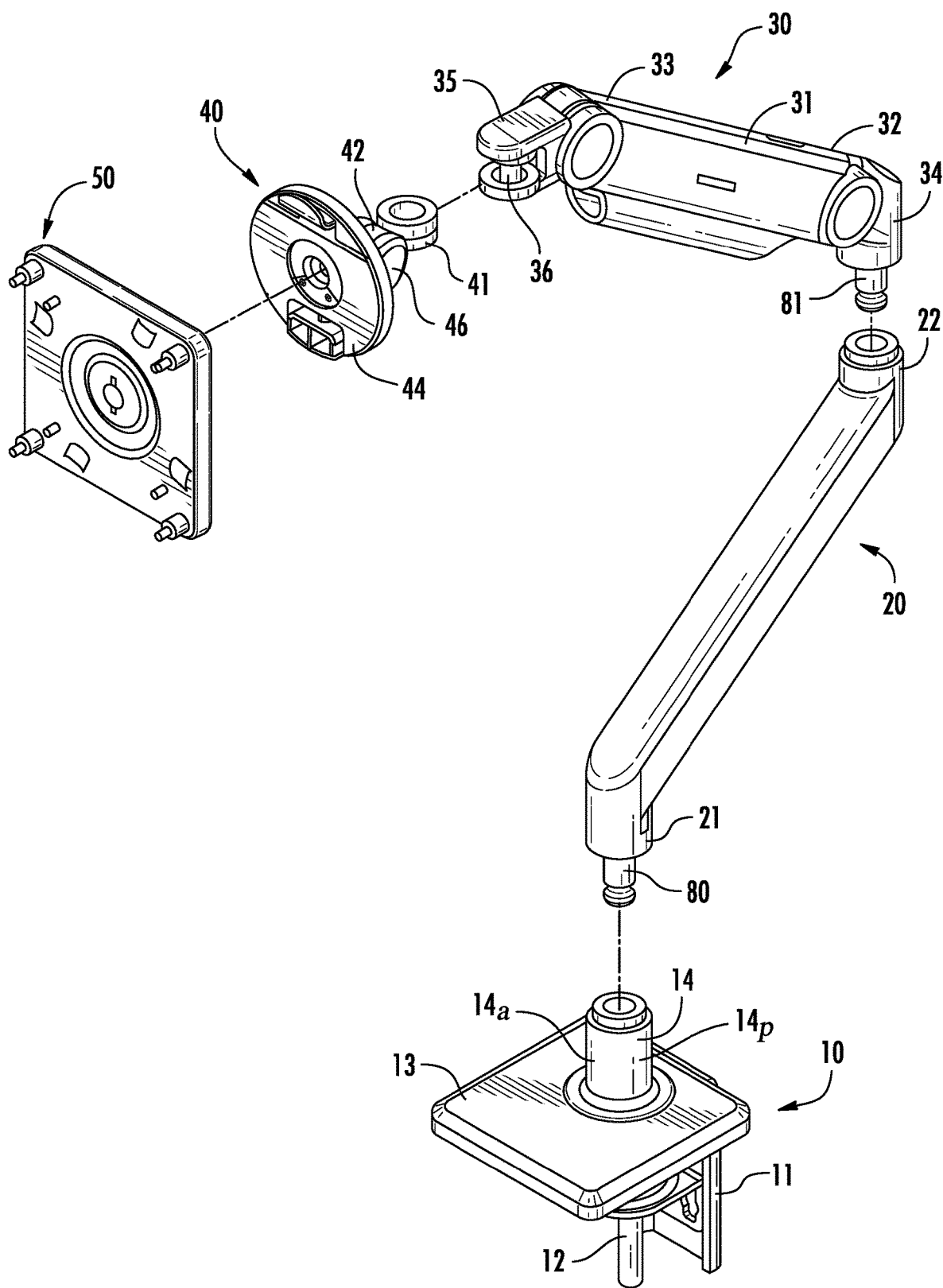
FIG. 2 is a front, partially exploded perspective view of the adjustable support arm shown in FIG. 1.
Figure 3:
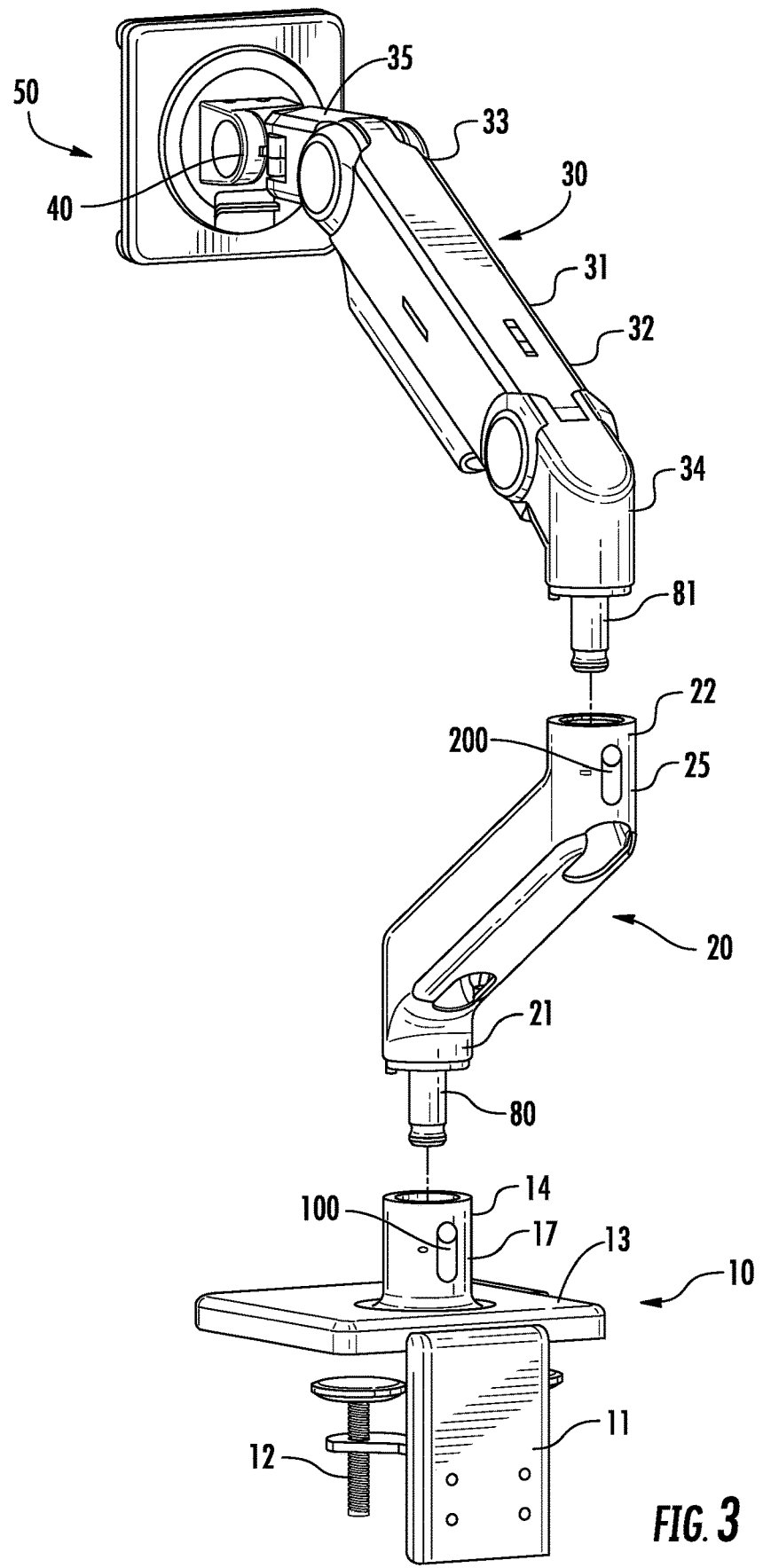
FIG. 3 is a rear, partially exploded perspective view of the support arm shown in FIG. 1.
Figure 14B:
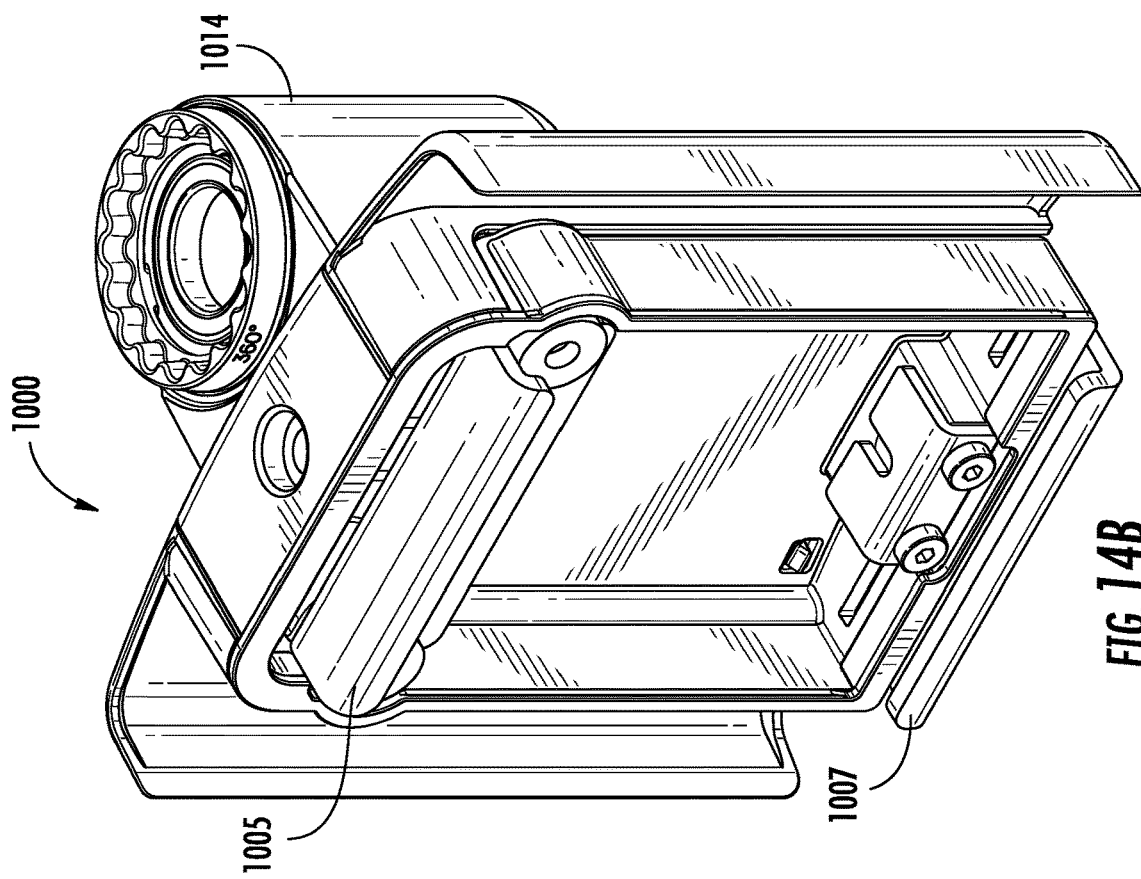
FIG. 14B is a rear perspective view of the alternative embodiment of the articulating joint suitable for use with the adjustable support arm of the present invention.
Figure 14A:
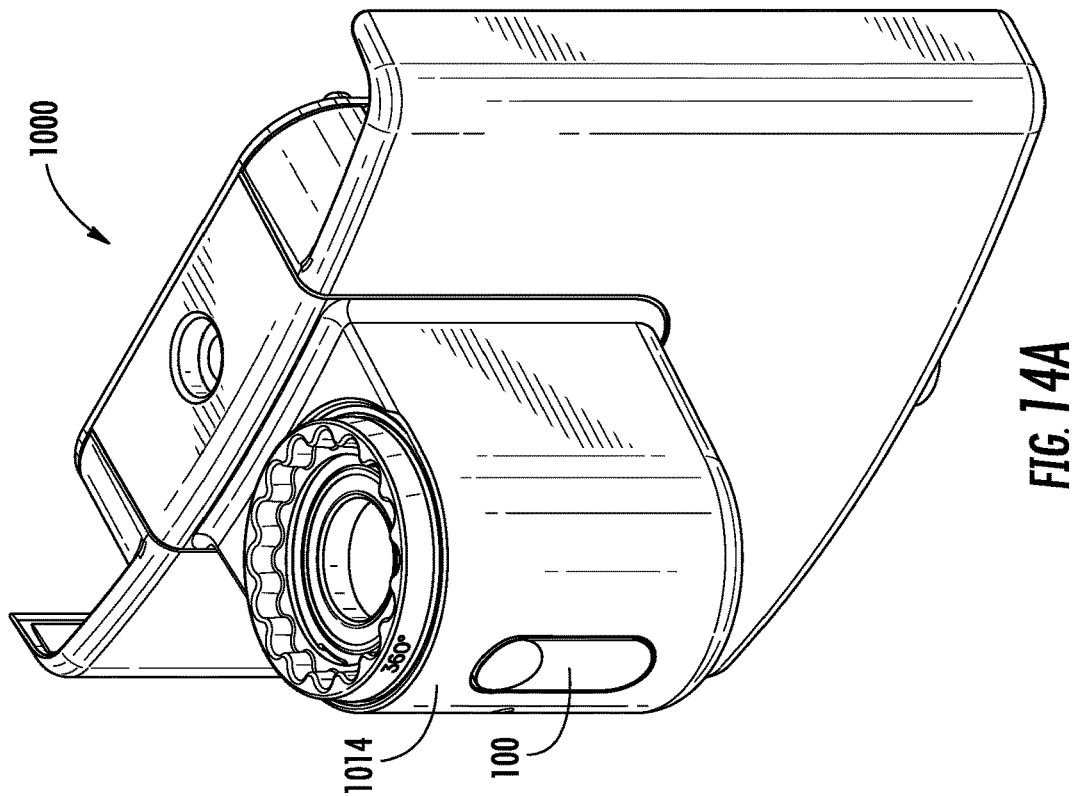
FIG. 14A is a front perspective view of an alternative embodiment of the base assembly suitable for use with the adjustable support arm of the present invention.
Figure 15:
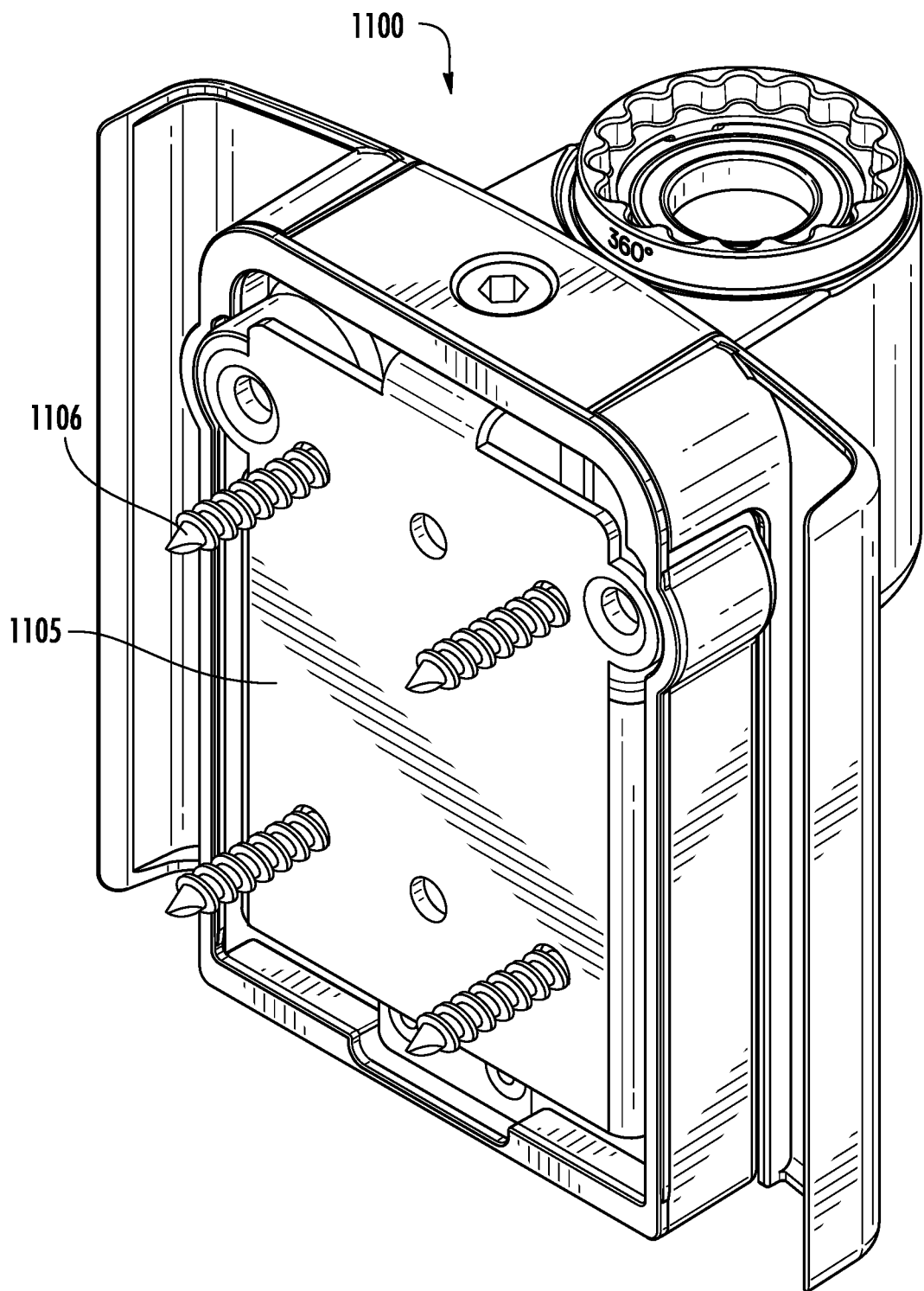
FIG. 15 is a rear perspective view of another alternative embodiment of the base assembly suitable for use with the adjustable support arm of the present invention.
Figure 16:
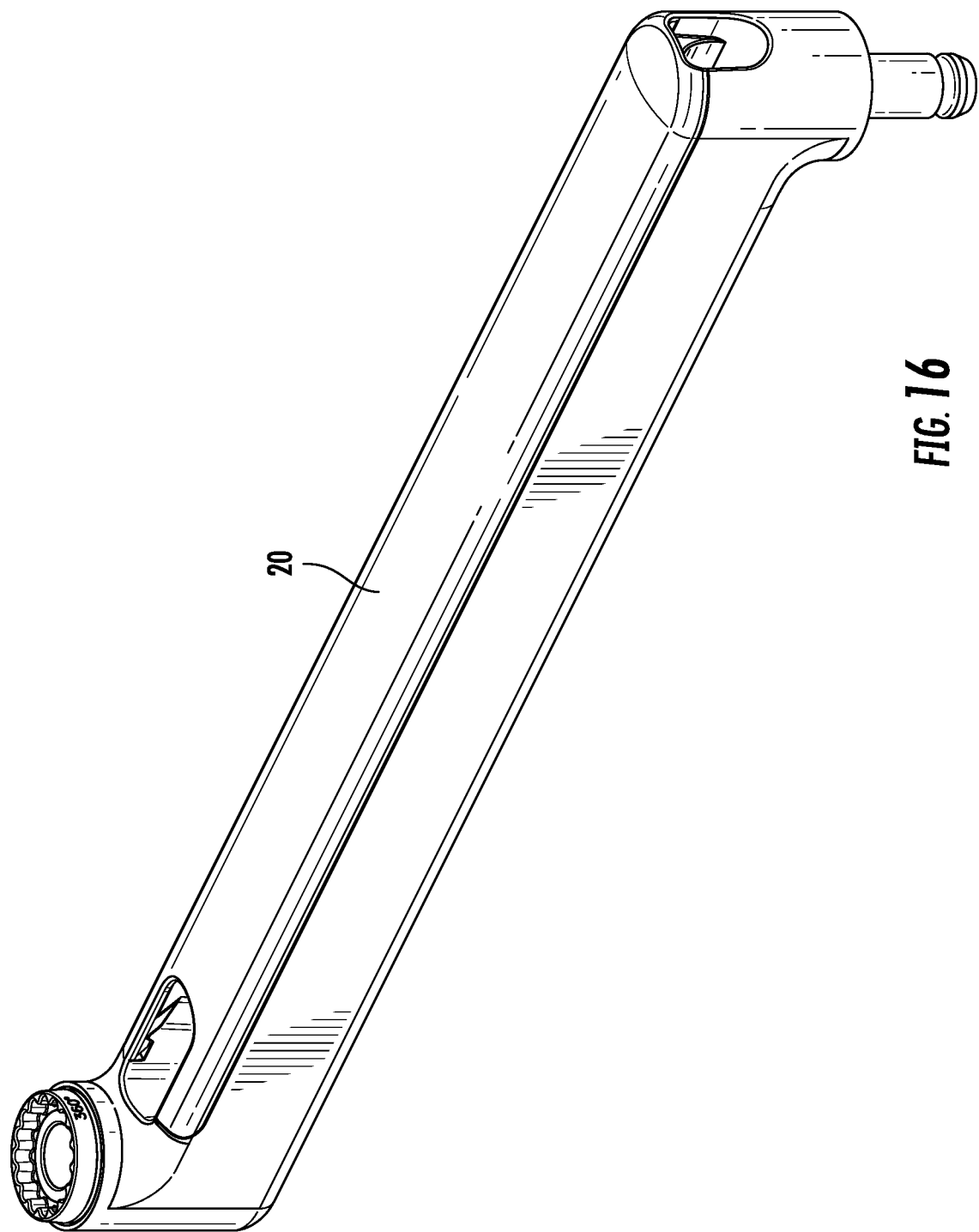
FIG. 16 is a perspective view of an alternative embodiment of a static arm suitable for use with the adjustable support arm of the present invention.

Referring now to FIGS. 1-3, an exemplary embodiment of an adjustable support arm 1 of the present invention is shown. In the exemplary embodiment depicted in FIGS. 1-3, the adjustable support arm 1 may comprise a base assembly 10, an arm assembly (20, 30) releasably mounted to the base assembly 10, an articulating joint 40 connected to the arm assembly (20, 30), and an accessory bracket assembly 50 connected to the articulating joint 40. In the exemplary embodiment depicted in FIGS. 1-3, the arm assembly may comprise a second arm 30 releasably mounted to a first arm 20. In the depicted exemplary embodiment, the second arm 30 is a dynamic arm while the first arm 20 is a static arm. The dynamic arm allows a user to optimize both the vertical and horizontal positioning of the accessory bracket assembly 50 relative to the user, thus providing the adjustable support arm 1 a wide range of height adjustability. In certain embodiments, the dynamic arm can be a counter-balanced, parallelogram support arm, such as U.S. Pat. No. 9,657,889 to Chumakov, the disclosure and all of the contents of which are incorporated herein by reference. In other embodiments, the dynamic arm 30 can be a single bar, pivot arm or any other known dynamic arm capable of providing height adjustability. The static arm can be a riser arm (e.g., FIGS. 1-3) designed to further optimize the vertical and horizontal positioning of the accessory bracket assembly 50, or the static arm can be a horizontal extension arm (e.g., FIG. 16) adapted for adjusting the horizontal positioning of the accessory bracket assembly 50 and any attached accessory relative to the base assembly 10. In alternative embodiments, the arm assembly can comprise a first arm only, with the first arm being either a dynamic arm or a static arm releasably mounted directly to the base assembly 10. In further alternative embodiments, the adjustable support arm 1 can optionally exclude both the second arm 30 and the articulating joint 40, with the first arm 20 having one end connected to the base assembly 10 and the other end connected to the accessory bracket assembly 50. The base assembly 10 functions to mount the adjustable support arm 1 to a work surface or other fixture, such as a slat wall. Referring to the exemplary embodiment depicted in FIGS. 1-3, the base assembly 10 may comprise a base plate 13 adapted to be positioned on the top of a work surface 3, a post 14 extending upward from the base plate 13, a clamp bracket 11 attached to the base plate 13 and extending below the work surface, and a screw 12 threadingly engaged with the clamp bracket 11. In order to secure the base assembly 10 to a work surface, the user can rotate the screw 12 until the screw's distal end comes into contact with the underside of the work surface. The exemplary embodiment of the base assembly 10 depicted in FIGS. 1-3 is configured to be mounted to the work surface 3 of an office desk. However, a skilled artisan will recognize that the base assembly 10 can be alternatively configured to be mounted to a wall or other fixture. For example, FIGS. 14A and 14B depict a base assembly 1000 configured for attachment to a slatwall. The base assembly 1000 can comprise first and second protrusions 1005,1007 adapted to engage grooves in a slatwall. The base assembly 1000 can further comprise a post 1014 housing a first release joint 100 and a panning insert as shown. FIG. 15 depicts an exemplary base assembly 1100 comprising a mounting plate 1105 and a plurality of screws 1106 for mounting the adjustable support arm 1 directly to a wall. Additionally, as shown in FIG. 12, each of the various embodiments of the base assembly may be configured to comprise two or more posts 14a,14b for attaching multiple arm assemblies to the base assembly, and the posts may contain the panning inserts.

Still referring to the exemplary embodiment depicted FIGS. 1-3, a first end 21 of the first arm 20 can be releasably attached to the post 14 utilizing a first connector shaft 80 coupled to a first release joint 100. As described in greater detail herein, the first release joint 100 may engage the first connector shaft 80 to secure the first arm 20 to the post 14 of the base assembly 10. To disengage the first release joint 100 from the first connector shaft 80 and remove the first arm 20, a user can access the first release joint 100 through a slot 17 positioned on the posterior side 14p of the post 14. In alternative embodiments, the slot 17 through which the first release joint 100 is accessed can be positioned on the anterior side 14a of the post 14, or on any other side of the post. In certain embodiments, the first arm 20 may be attached to the base assembly 10 in a manner allowing a user the ability to adjust the front-to-back positioning (i.e., depth)

of the support arm 1 by rotating the first arm 20 about its connection to the base assembly 10. In other embodiments, the first arm 20 may be attached to the base assembly 10 in a manner preventing rotation of the first arm 20 relative to the base assembly 10. Still referring to the exemplary embodiment depicted in FIGS. 1-3, the second arm 30 can comprise a parallelogram linkage 31 having a first end 32 pivotally attached to a lower bracket 34 and a second end 33 pivotally attached to an upper bracket 35. The lower bracket 34 of the second arm 30 can be releasably attached to the second end 22 of the first arm 20 utilizing a second connector shaft 81 coupled to a second release joint 200. To disengage the second release joint 200 from the second connector shaft 81 and remove the second arm 30, a user can access the second release joint 200 through a slot 25 formed on the posterior side 22p of the second end 22 of the first arm 20. In alternative embodiments, the user can access the second release joint 200 through a slot 25 formed on the anterior side 22a of the second end 22 of the first arm 20, or on any other side of the second end 22 of the first arm 20.

Figure 13A:
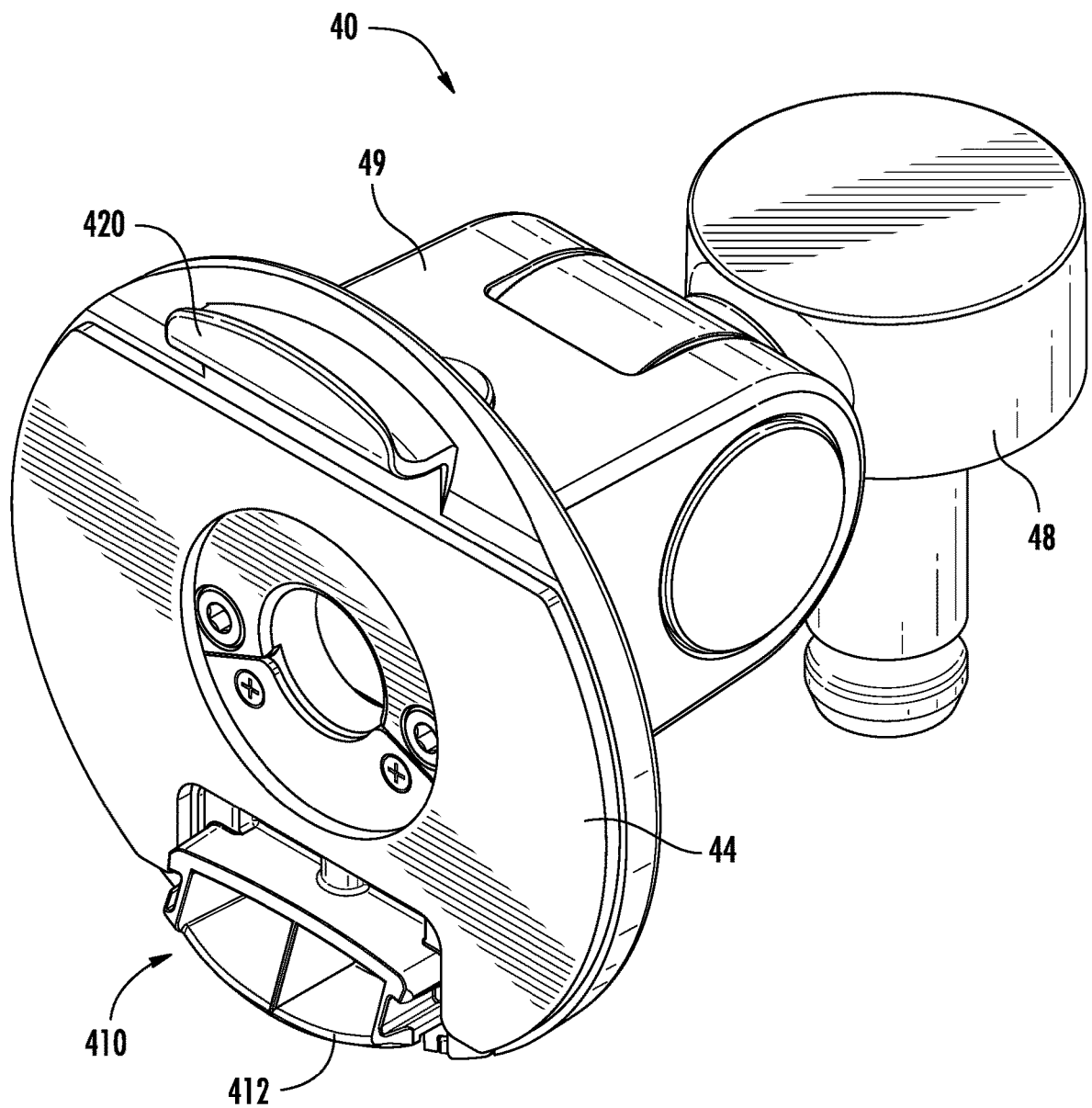
FIG. 13A is a perspective view of an alternative embodiment of the articulating joint suitable for use with the adjustable support arm of the present invention.

The articulating joint 40 functions to provide the attached accessory bracket assembly 50 a wide range of adjustability, such as panning/swiveling (i.e., a left or right angled movement), tilting (i.e., an upward or downward angled movement), and/or rotation (i.e., turning from landscape to portrait view). Referring to the exemplary embodiment depicted in FIGS. 1-3, the articulating joint 40 can comprise a swivel ring 41, a tilt ring 42 attached to the swivel ring 41, and a mounting plate 44 attached to the tilt ring 42. The swivel ring 41 can be attached to the upper bracket 35 via a swivel pin 36 so as to allow side-to-side panning movement. The mounting plate 44 can be attached to the tilt ring 42 via a tilt pin 43 so as to allow up-to-down tilting movement. In alternative embodiments, the articulating joint 40 can take on a variety of forms. For example, a turret-style articulating joint 40 is depicted in FIG. 13A. The turret-style articulating joint 40 can comprise a turret 48 capable of being secured to the second arm 30, a tilt hub 49 pivotally attached to the turret 48, and a mounting plate 44 attached to the tilt hub 49.

Figure 9A:
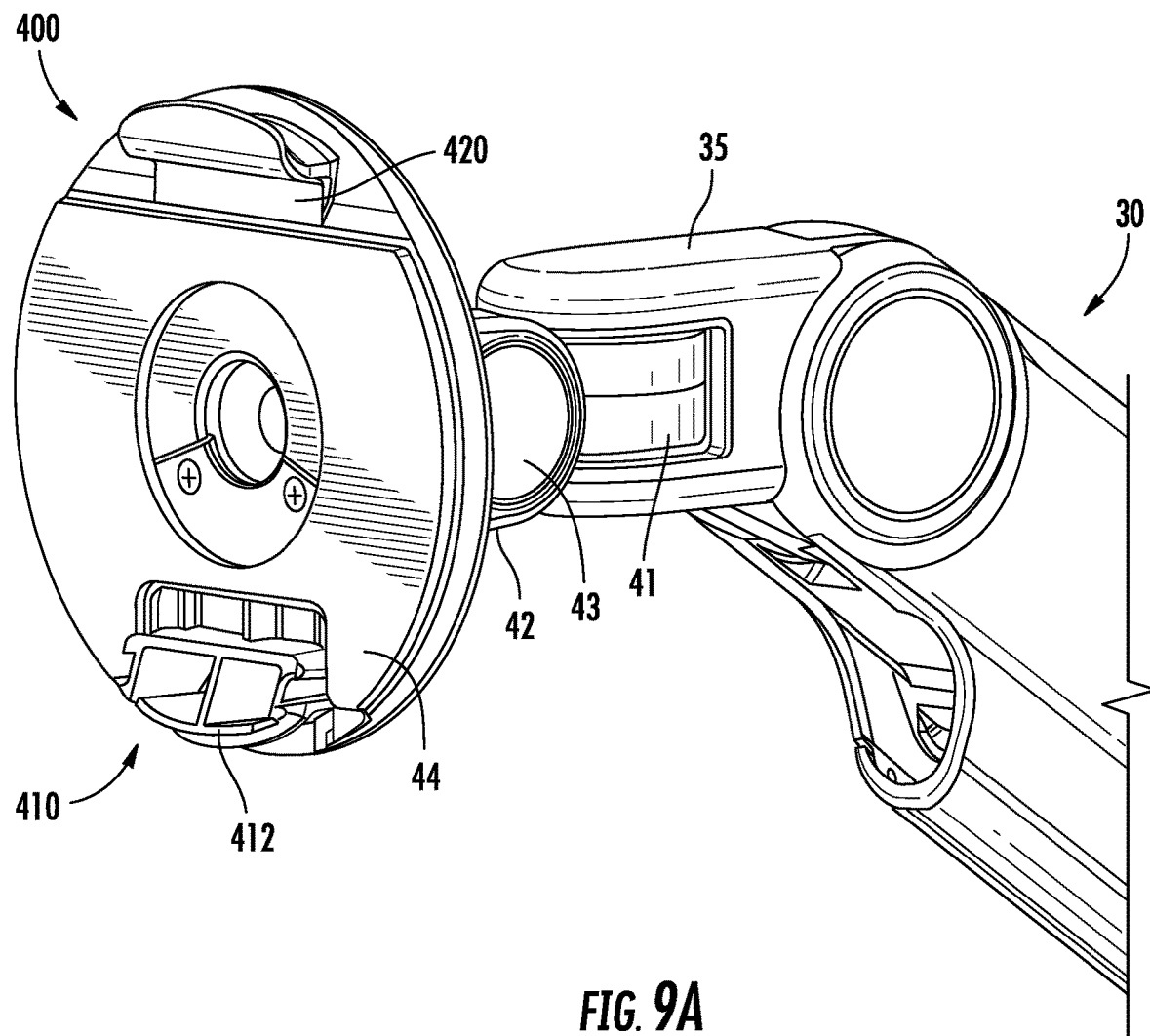
FIG. 9A is a perspective view of an exemplary embodiment of the accessory bracket assembly connected to an exemplary embodiment of the articulating joint of an adjustable support arm of the present invention.
Figure 9B:
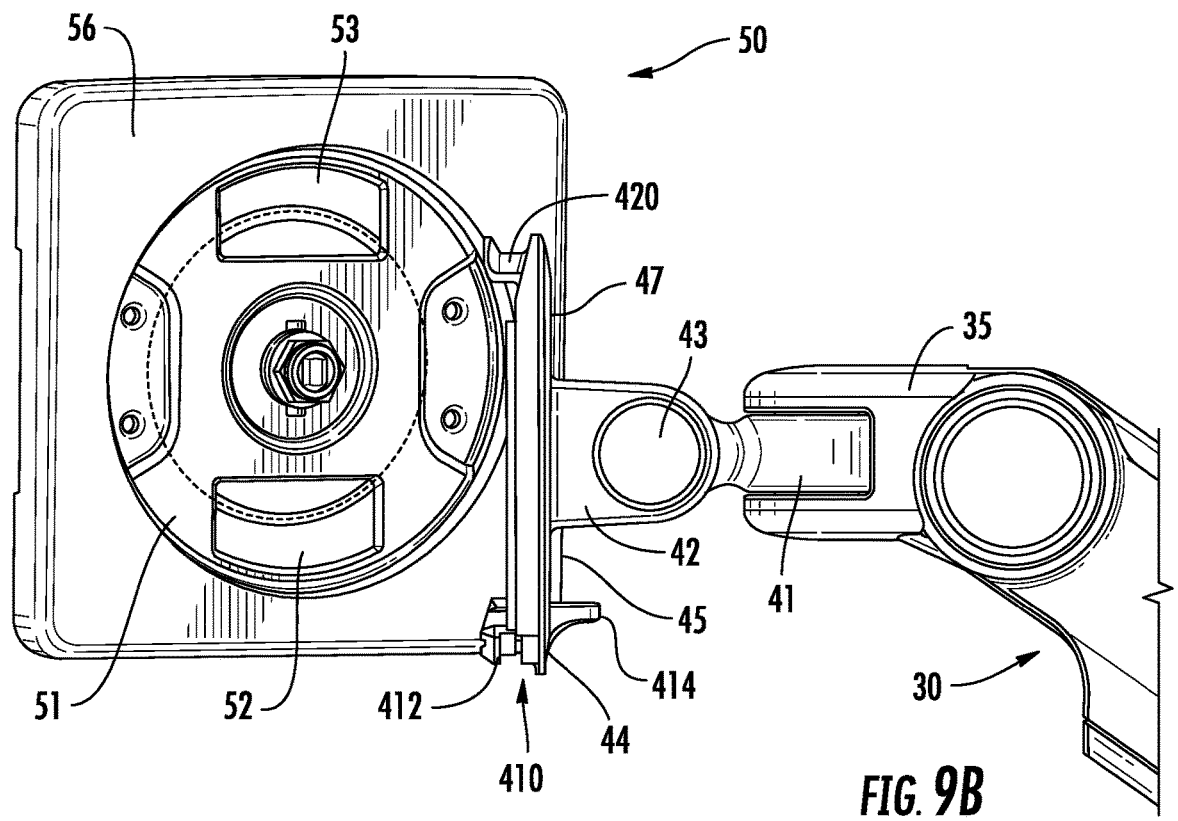
FIG. 9B is a partially exploded, perspective view of an exemplary embodiment of the accessory bracket assembly and the articulating joint.
Figure 9C:
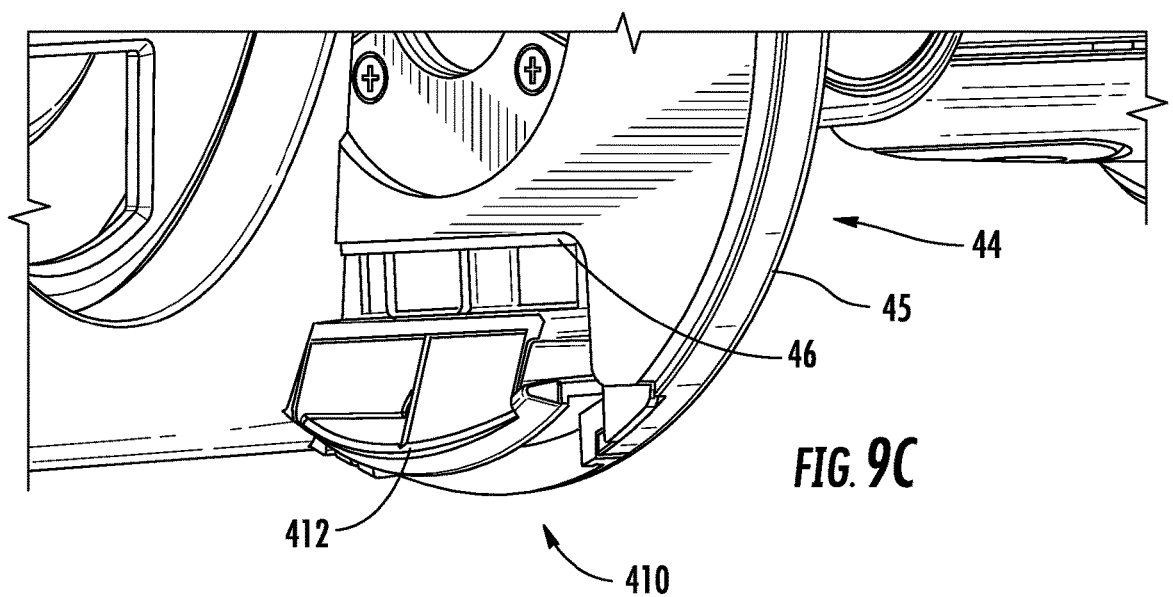
FIG. 9C is a perspective view of an exemplary embodiment of the quick-release accessory fastening mechanism useful for releasably connecting the accessory bracket assembly to the articulating joint.
Figure 9D:
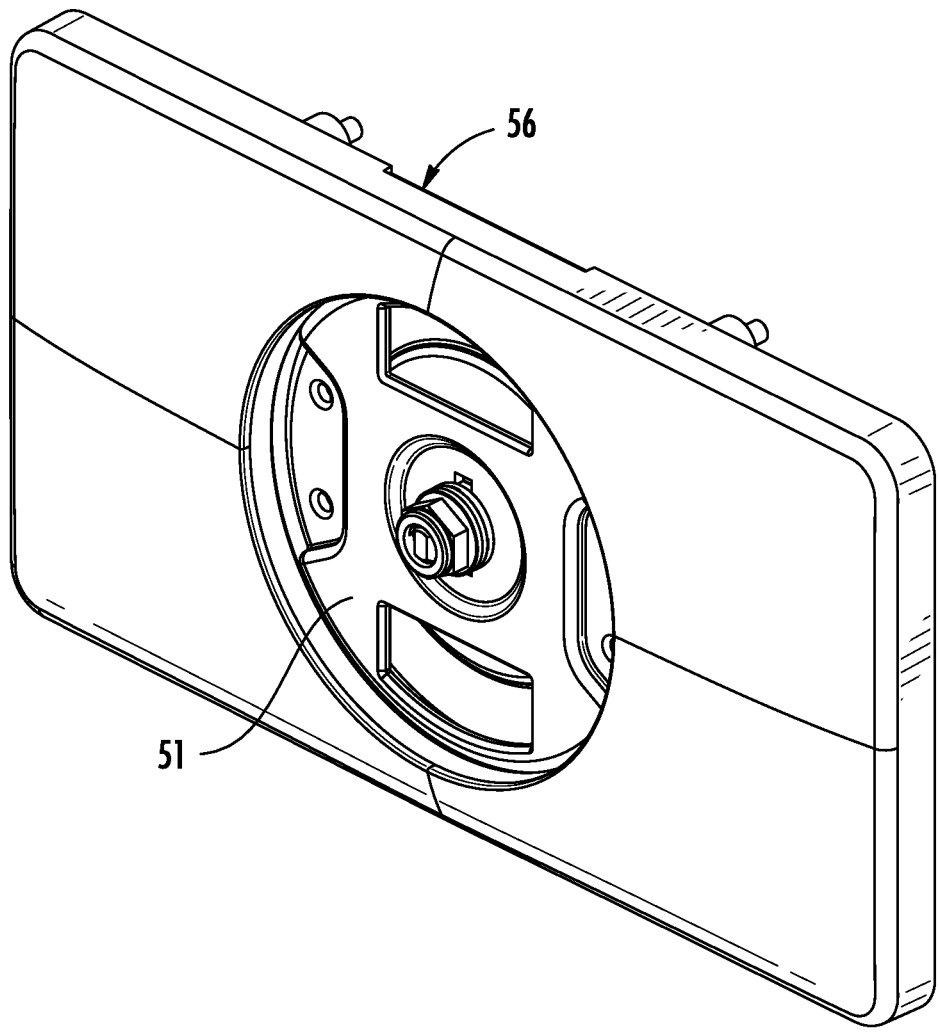
FIG. 9D is a perspective view of an alternative embodiment of the accessory bracket assembly.
Figure 9E:
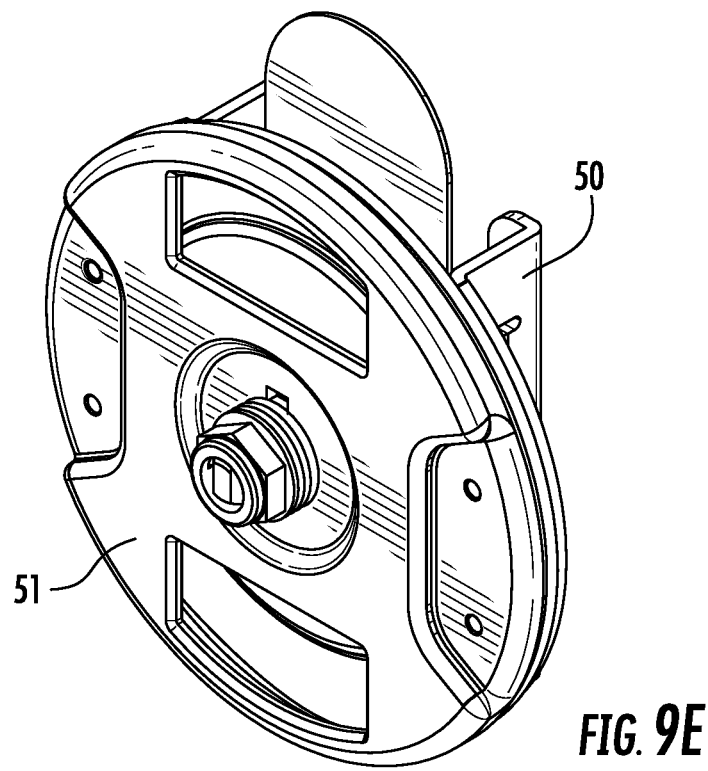
FIG. 9E is a front perspective view of an alternative embodiment of the accessory bracket assembly utilizing an adaptor bracket.
Figure 9F:
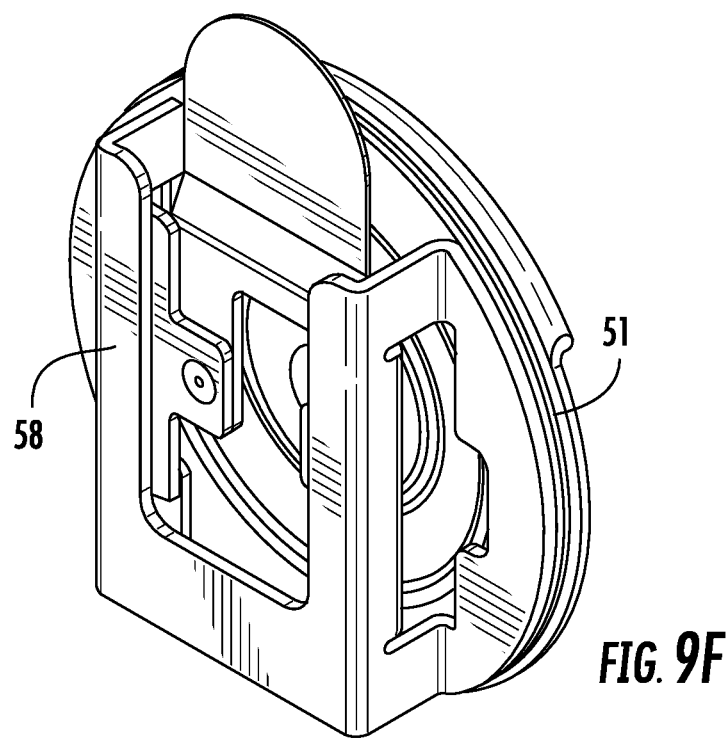
FIG. 9F is a rear perspective view of the alternative embodiment of the accessory bracket assembly depicted in FIG. 9E.
Figure 9G:
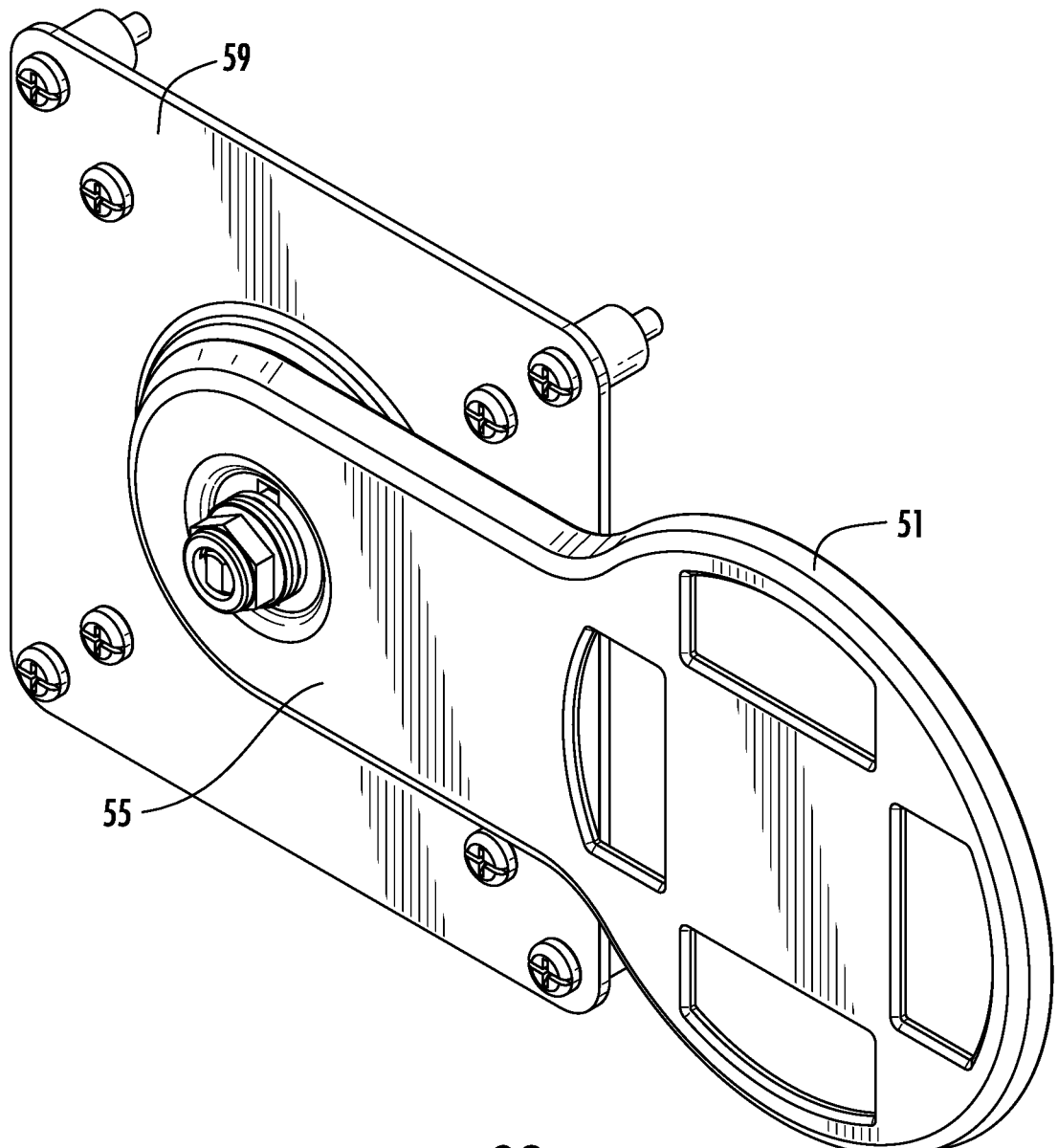
FIG. 9G is a rear perspective view of an alternative embodiment of the accessory bracket assembly utilizing an offset VESA bracket.
Figure 10A:
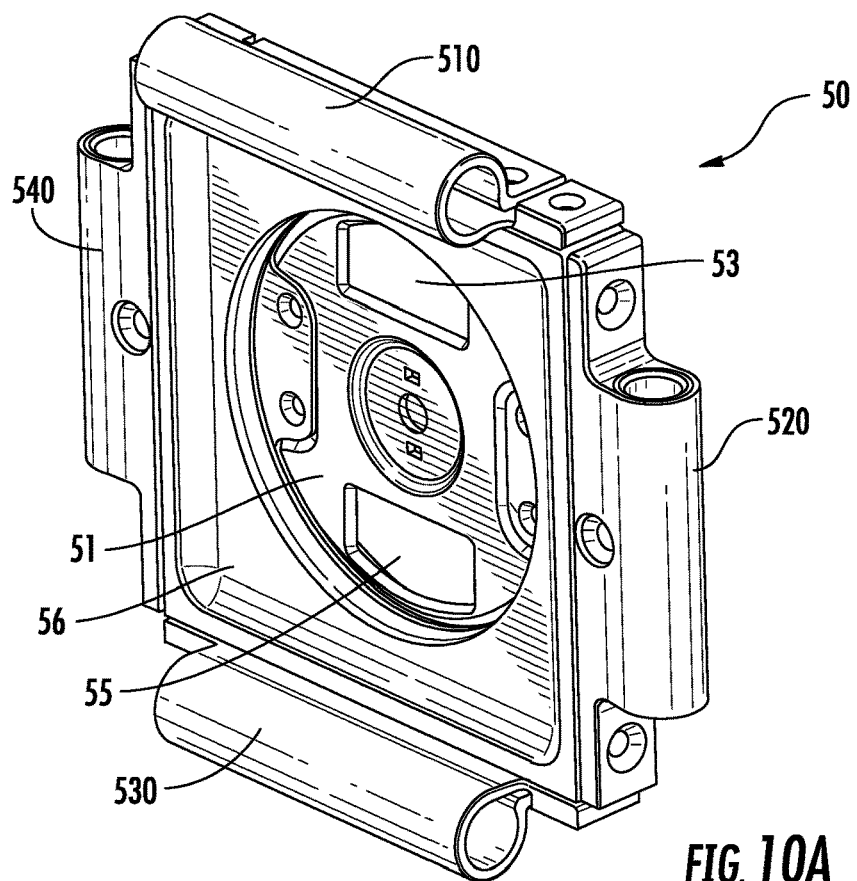
FIG. 10A is a perspective view of an exemplary embodiment of the accessory bracket assembly.
Figure 10B:
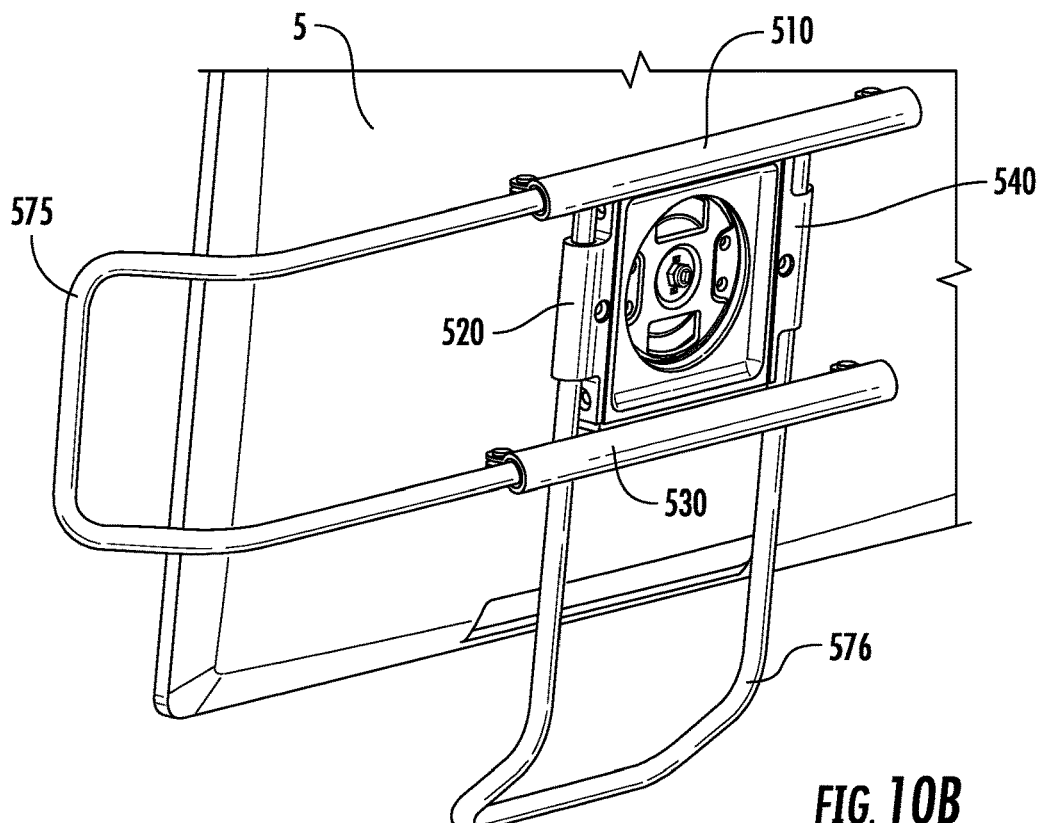
FIG. 10B is a perspective view of an exemplary embodiment of the accessory bracket assembly.

The accessory bracket assembly 50 can be releasably attached to the mounting plate 44. An embodiment of the accessory bracket assembly 50 is depicted in FIGS. 10A and 10B. The accessory bracket assembly 50 can comprise a central bracket 51 positioned within a frame 56. The frame 56 may comprise a VESA plate adhering to the standards created by the Video Electronics Standards Association, but can comprise other plates or mounts suitable for mounting various electronic equipment, including Apple® products. The frame 56 has an inner cavity for housing the central bracket 51. The frame 56 can be secured to the central bracket 51 with one or more fasteners. In the embodiment depicted in FIGS. 9B and 10A-10B, the frame 56 comprises a 100×100 VESA plate. Select alternative embodiments of the accessory bracket assembly 50 are depicted in FIGS. 9D-9G. FIG. 9D shows an alternative embodiment of the accessory bracket assembly whereby a 100×200 frame 58 is attached to the central bracket 51. As shown in the alternative embodiment depicted in FIGS. 9E and 9F, an adaptor bracket may be attached to the central bracket 51 to allow for non-VESA compliant accessories to be mounted to the support arm 1. FIG. 9G depicts an alternative embodiment of the accessory bracket assembly 50 whereby an offset central bracket 51 comprising a horizontal beam 55 is pivotally attached to a VESA bracket 59, thereby allowing the accessory mounted to the VESA bracket 59 to be positioned in an offset orientation relative to the offset central bracket 51. As shown, any suitable frame or bracket can be utilized to attach the desired accessories to the monitor arm of the invention.

The adjustable support arm 1 may comprise one or more quick-release joints for releasably connecting the components of the adjustable support arm 1. For example, a first quick-release joint 100 may be utilized to releasably connect the arm assembly 20,30 to the base assembly 10, while a second quick-release joint 200 may be utilized to releasably connect the second arm 30 to the first arm 20 in embodiments where a second arm 30 is utilized.

Figure 4A:
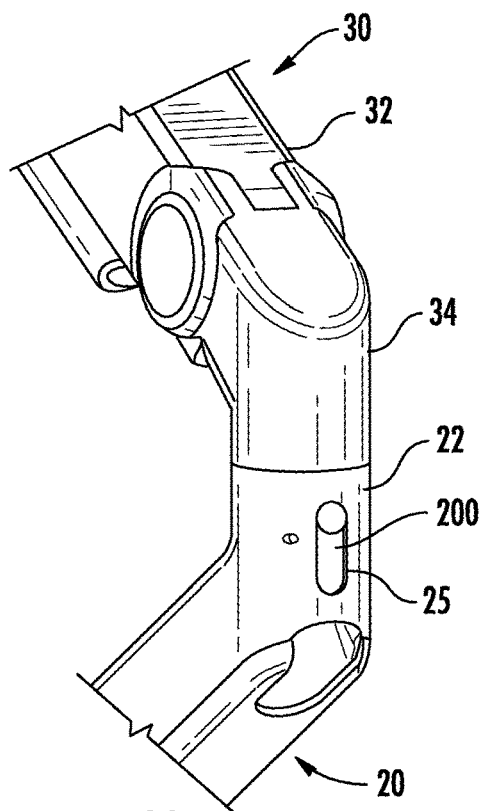
FIG. 4A is a rear perspective view of an exemplary embodiment of a quick release joint useful for releasably connecting the second arm to the first arm of the adjustable support arm shown in FIG. 1.
Figure 4B:
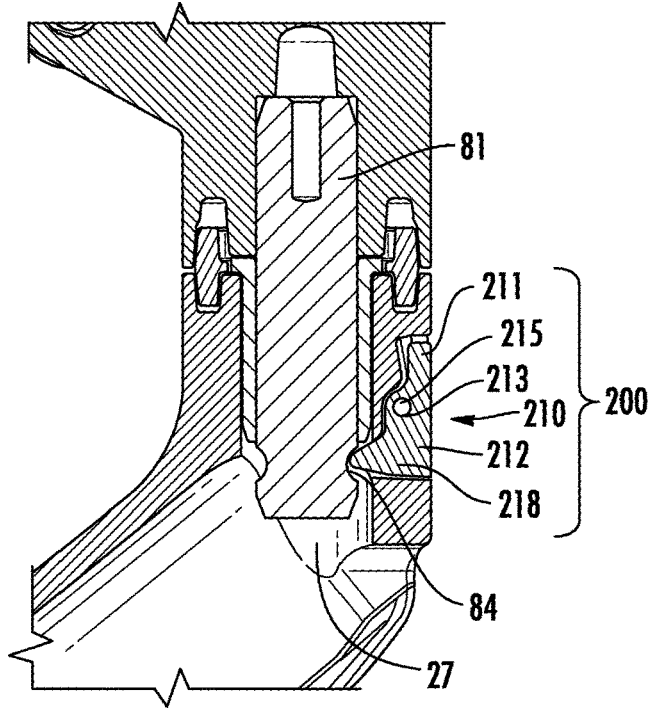
FIG. 4B is a cross-sectional view of the quick release joint shown in FIG. 4A.
Figure 4C:
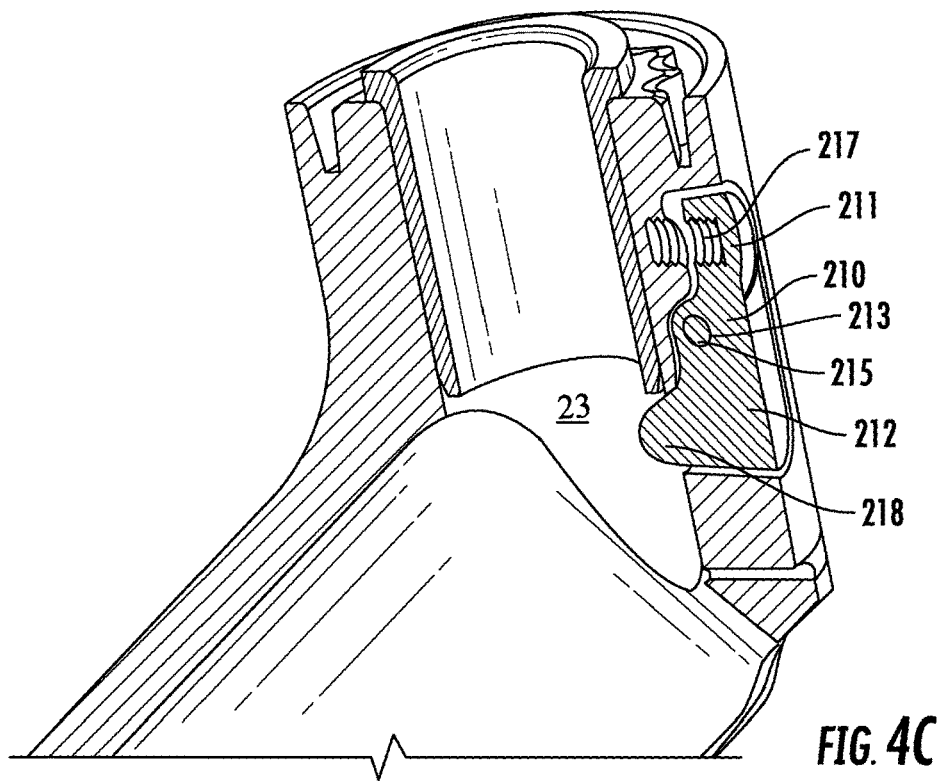
FIG. 4C is a cross-sectional view of the quick release joint shown in FIG. 4A.

Referring to FIGS. 4A-4C, an exemplary embodiment of the second release joint 200 useful for releasably connecting the second arm 30 to the first arm 20 of the adjustable support arm 1 is shown. The second release joint 200 can comprise a latch 210, an axle 215, and a spring 217. The latch 210 can comprise an upper portion 211, a lower portion 212 having a protrusion 218, and an aperture 213 positioned between the upper and lower portions 211, 212. The latch 210 can be pivotally connected to the second end 22 of the first arm 20 via an axle 215 extending through the aperture 213, with the axle 215 functioning as a fulcrum about which the latch 210 pivots. Meanwhile, the connector shaft 81 can be secured within the central chamber 37 of the lower bracket 34 by any means known in the art, such as via a bolt or by way of a pressure fitting.

In operation, a user can attach the second arm 30 to the first arm 20 by sliding the connector shaft 81 into the central bore 23 formed in the second end 22 of the static arm 20. A spring 217 can be positioned between the static arm 20 and the upper portion 211 of the latch 210 to bias the latch's protrusion 218 into engagement with the indentation 84, thus locking the second arm 30 into connection with the first arm 20. When the support arm 1 is swiveled from side-to-side, the connector shaft 81 will move relative to the central bore 23 formed in the second end 22 of the first arm 20, with the connector shaft 81 and the central bore 23 preferably being in frictional engagement to minimize slack in the joint and provide damping. To detach the second arm 30, a user can access the second release joint 200 through the slot 25 formed in the second end of the first arm 20. By pressing the upper portion 211 inward relative to the first arm 20, the latch 210 will rotate about the axis and thus cause the protrusion 218 to disengage from the indentation 84 in the connector shaft 81, thus allowing the user to lift the second arm 30 from the central bore 23 formed in the second end 22 of the first arm 20. In alternative embodiments, the protrusion 218 can be formed in the upper portion 211 instead of the lower portion 212 as depicted in FIGS. 4A-4C. In alternative embodiments, the spring 217 can comprise a leaf spring, a Belleville spring, or any other spring known in the art. Further, the latch 210 can be any suitable shape known in the art to achieve the functions described above.

Figure 5A:
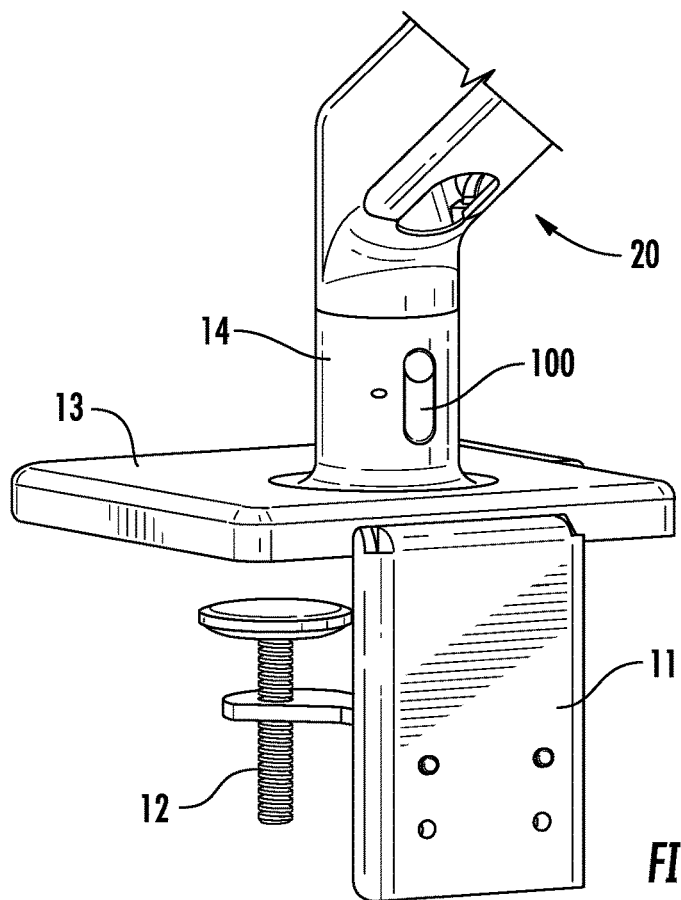
FIG. 5A is a rear perspective view of an exemplary embodiment of a quick release joint useful for releasably connecting the arm assembly to a base assembly of the adjustable support arm shown in FIG. 1.
Figure 5B:
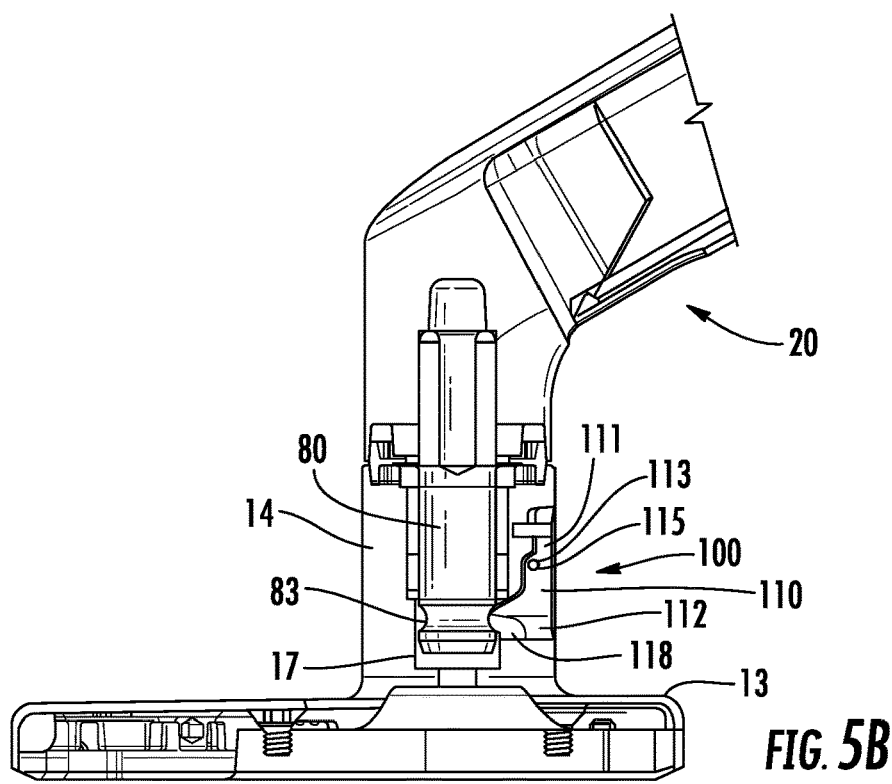
FIG. 5B is a side, partially transparent view of the quick release joint shown in FIG. 5A.

Referring to FIGS. 5A-5B, an exemplary embodiment of the first release joint 100 useful for releasably connecting the arm assembly 20, 30 to the base assembly 10 of the adjustable support arm 1 is shown. The first release joint 100 shown in FIGS. 5A-5B is substantially similar to the exemplary embodiment of the second release joint 200 shown in FIGS. 4A-4C, with reference numerals for like components differing by 100. In operation, a user can attach the first arm 20 to the post 14 by sliding the connector shaft 80 into the central bore 17 formed in the post 14 of the base assembly 10.

Figure 7:
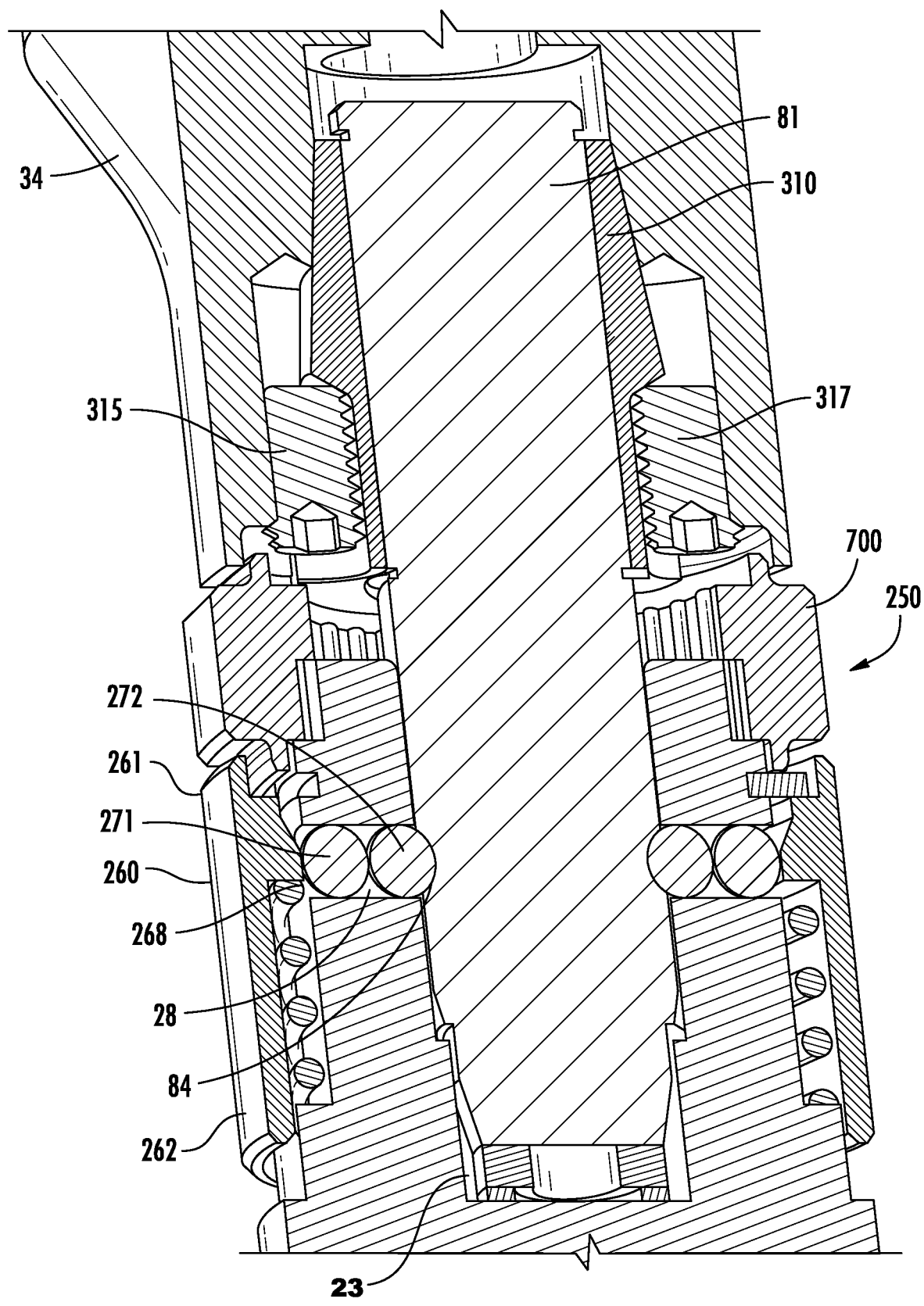
FIG. 7 is a cross-sectional view of an alternative embodiment of a quick release joint useful for releasably connecting the sections of the adjustable support arm shown in FIG. 1.

Referring now to FIG. 7, an alternative embodiment of a release joint suitable for releasably connecting the components of the adjustable support arm 1 is shown. The release joint 250 depicted in FIG. 7 is shown releasably connecting the second arm 30 to the first arm 20, although a skilled artisan will readily recognize that the release joint 250 could be utilized to releasably connect the first arm 20 to the base assembly 10 as well. Referring to FIG. 7, the release joint 250 can comprise a latch 260 and roller balls 271, 272 positioned in a passage 28 that extends into the central bore 23 of the first arm 20, with an identical latch and roller balls optionally positioned on an opposing second side of the first arm 20. The latch 260 can comprise an upper portion 261 and a lower portion 262, with the upper portion 261 having a protrusion 268 defining a linear cam surface adapted for selectively engaging the roller ball 271. The latch 260 can be slidingly attached to the second end 22 of the first arm 20 by, for example, having a longitudinal flange on the latch 260 engaging a slot integrated into the second end 22 of the first arm 20. In operation, a user can attach the second arm 30 to the first arm 20 by sliding the connector shaft 81 into the central bore 23 formed in the second end 22 of the first arm 20. To secure the second arm 30 in place, the user can slide the latch 260 upwards relative to the base assembly 10, thereby causing the linear cam surface of the protrusion 268 to engage the roller ball 271 and cause the roller ball 271 to move inward within the passage 28 towards the central bore 23. This in turn will force the roller ball 272 to also move inward within the passage 28 and into engagement with the indentation 84 in the connector shaft 81, thus securing the second arm 30 in place. In certain embodiments, a spring can be utilized to bias the latch 260 upwards relative to the base assembly 10, thereby dispensing with the necessity for the user to slide the latch 260 to secure the second arm 30. To detach the second arm 30, the user can slide the latch 260 downwards relative to the base assembly 10, thereby causing the linear cam surface of the protrusion 268 to disengage from the roller ball 271. This will allow the roller balls 271, 272 to move outward within the passage 28 and have the roller ball 272 disengage from the indentation 84 in the connector shaft 81. In further alternative embodiments of the release joint 250, the protrusion 268 can be formed in the lower portion 262 of the latch 260 instead of the upper portion 261 as depicted in FIG. 7. Moreover, in further alternative embodiments, the biasing spring can bias the latch 260 downwards relative to the base assembly 10 as opposed to upwards.

Figure 6A:
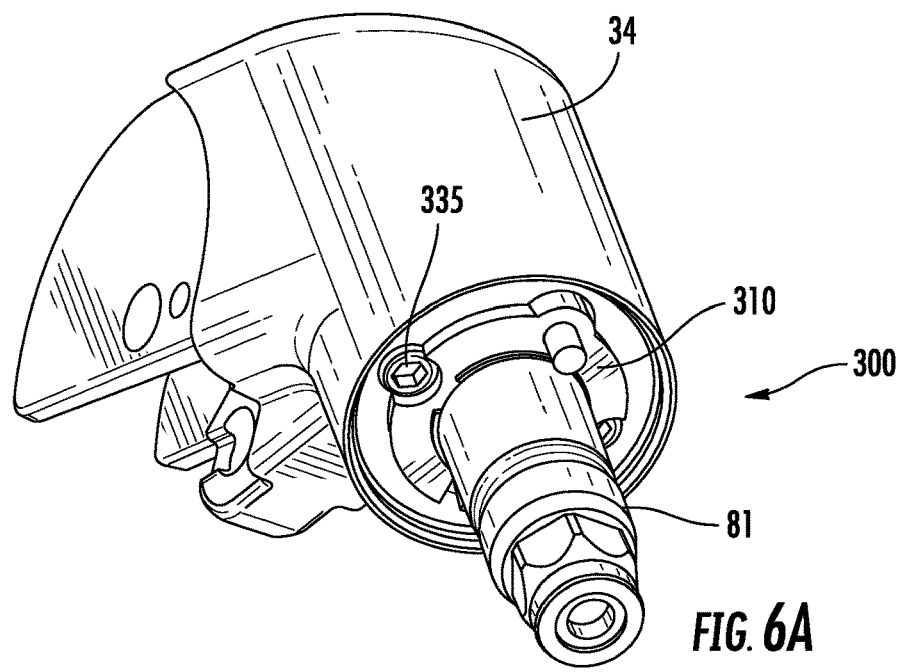
FIG. 6A is a perspective view of an exemplary embodiment of a friction cartridge assembly useful for connecting the arm assembly to the base assembly in a manner which reduces slack in the joint.
Figure 6B:
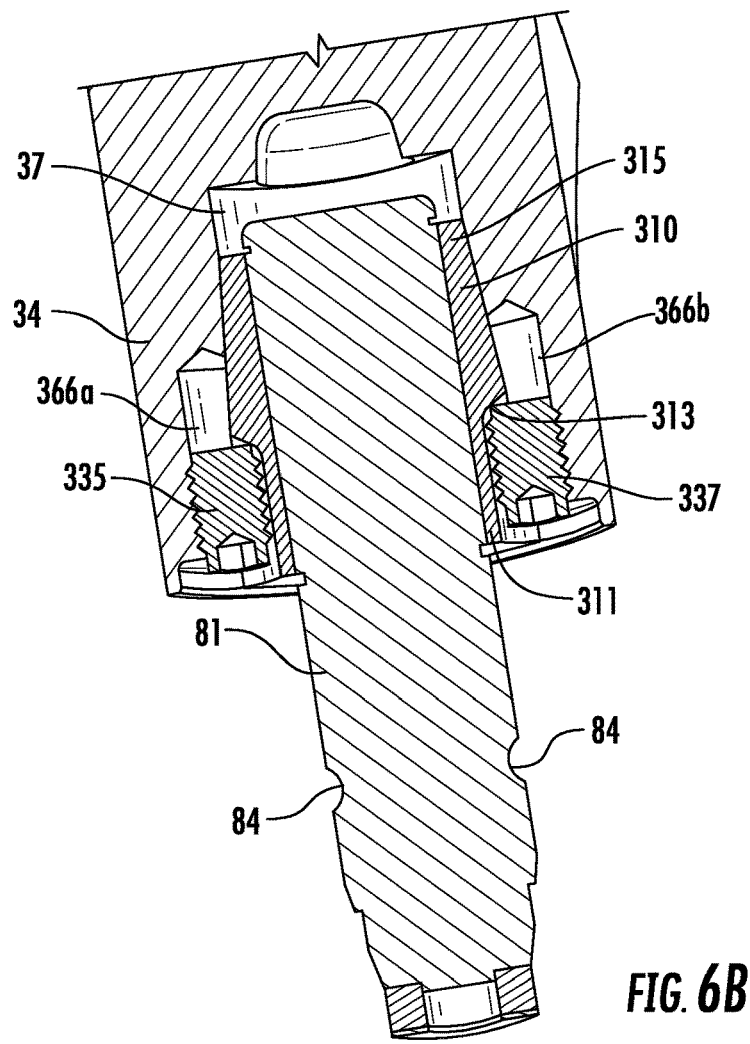
FIG. 6B is cross-sectional view of the friction cartridge assembly shown in FIG. 6A.

Referring to FIGS. 6A-6B, an exemplary embodiment of a friction cartridge assembly 300 is shown. The friction cartridge assembly may be utilized as an alternative means for coupling the joints of the adjustable support arm 1. The friction cartridge assembly 300 functions to dampen side-to-side movement of the arm assembly 20, 30 using friction, while also reducing slack in the joint(s) of the adjustable support arm 1. In FIGS. 6A-6B, the friction cartridge assembly 300 is depicted as being utilized in the joint formed by the second arm 30 and the first arm 20 of the arm assembly. However, an identical friction cartridge assembly 300 can be utilized in the joint formed by the first arm 20 and the base assembly 10. Similarly, in embodiments whereby the arm assembly consists of a second arm 30 only, a friction cartridge assembly 300 can be utilized in the joint formed by the second arm 30 and the base assembly 10.

Referring to FIGS. 6A-6B, the friction cartridge assembly 300 can comprise a taper-lock bushing 310 and set screws 335,337. The taper-lock bushing 310 may feature an outer profile adapted to frictionally engage a tapered, internal central chamber 37 formed in the lower bracket 34 of the second arm 30, and the taper-lock bushing 310 may feature an inner profile adapted to frictionally engage the connector shaft 81. Meanwhile, the set screws 335,337 function to secure the taper-lock bushing 310 into place within the central chamber 37 of the lower bracket 34, while also functioning to adjust the friction applied by the taper-lock bushing 310 to the connector shaft 81. In operation, a shaped end (e.g., polygon-shaped) of the connector shaft 81 will mate with a congruent seat in the central bore 23 to fix the connector shaft 81 in place such that the connector shaft 81 does not rotate relative to the first arm 20 when the support arm 1 is swiveled from side-to-side. As the support arm 1 is swiveled from side-to-side, the connector shaft 81 will remain stationary due to the shaped end of the connector shaft 81 being mated with a congruent seat in the central bore 23 of the first arm 20. However, the taper-lock bushing 310 will rotate with the lower bracket 34 of the second arm 30 as it is swiveled from side-to-side, with the friction between the connector shaft 81 and the taper-lock bushing 310 functioning to dampen this side-to-side movement.

A user can secure the taper-lock bushing 310 within the central chamber 37 of the lower bracket 34 by driving the set screws 335,336 into threaded apertures 36a,36b formed in the lower bracket 34. In this exemplary embodiment, the distal ends of the set screws 335,336 will abut the shoulders 313 of the taper-lock bushing 310 and force the tapered, upper portion 315 of the taper-lock bushing 310 into wedging engagement with the tapered, central chamber 37 of the lower bracket 34. A user can also optimize the friction applied by the taper-lock bushing 310 to the connector shaft 81 by driving the set screws 335,336 into threaded apertures 36a,36b formed in the lower bracket 34. As the set screws 335,336 are driven into the threaded apertures 366a,366b, the lower portion 311 of the taper-lock bushing 310 will deflect inward towards the connector shaft 81, thus increasing the friction between the connector shaft 81 and the taper-lock bushing 310.

Referring now to FIGS. 8A-8G, an exemplary embodiment of an adjustable panning insert 700 suitable for adjusting the range of side-to-side (i.e., panning or swiveling) motion of the support arm 1 is depicted. The adjustable panning insert 700 may be a ring-shaped, hollow cylinder having an outer wall 701, an inner wall 702, a first end 704, and a second end 705. The adjustable panning insert can be other shapes, including but not limited to a sphere, prism, or cube. In one embodiment, the adjustable panning insert 700 further defines a radial plane and a longitudinal plane. The inner wall 702 can comprise a first spline 710 and a second spline 712 positioned adjacent to one another along the surface of the inner wall 702 and each comprising teeth 714 extending inward from the inner wall 702. The first spline 710 is positioned proximate to the first end 704, and the second spline 712 is positioned proximate to the second end 705. The adjustable panning insert 700 may further comprise first and second projections 715,716 spaced apart along the circumference of the second end 705 and extending vertically therefrom; i.e., the first and second projections 715,716 extend in a direction that is perpendicular to the radial plane of the adjustable panning insert 700. In the embodiment depicted in FIGS. 8A-8B and 8E-8G, the first projection 715 is spaced apart from the second projection 716 along the circumference of the second end 705 of the adjustable panning insert 700 by approximately 90 degrees relative to the center of the adjustable panning insert 700 (See FIG. 8G). In an alternative embodiment, the first projection 715 can be spaced apart from the second projection 716 along the circumference of the second end 705 by 60 degrees. In further embodiments, the first and second projections 715, 716 can be spaced apart at a multitude of distances. Moreover, in further alternative embodiments, the adjustable panning insert 700 may also comprise third and fourth projections spaced apart along the circumference of the first end 704. Instead of splines, pins and holes may be used, or any other suitable mating means or mechanisms may be used, for achieving the functions described with respect to the adjustable panning insert 700.

The adjustable panning insert 700 restricts the range of side-to-side motion of the support arm 1 through its interaction with the lower bracket 34 of the second arm 30. In the exemplary embodiment depicted in FIGS. 8A-8G, the adjustable panning insert 700 is shown being retained within the second end 22 of the first arm 20. In embodiments whereby the arm assembly does not include a first arm 20, the adjustable panning insert 700 can be retained in a housing formed in the post 14 of the base assembly 10. Referring to FIG. 8C, the housing formed in the second end 22 of the first arm 20 may comprise a channel 24 formed in the upper end of the first arm 20. The channel 24 can define an outer wall 26 and an inner wall 27. A spline 29 having a plurality of teeth 29a can be positioned along the outer periphery of the inner wall 27 such that the teeth 29a extend radially from the inner wall 27 and partially into the channel 24 for mating with either the first or second splines 710,712 of the adjustable panning insert 700, depending on which side of the panning insert 700 is facing up. The spline 29 can further comprise one or more pockets 29b adapted to receive and mate with the first and second projections 715,716 of the adjustable panning insert 700 when the adjustable panning insert 700 is oriented such that the second spline 712 engages with the spline 29 formed in the channel 24 of the first arm 20. Referring now to FIG. 8D, the lower bracket 34 of the second arm 30 can comprise a groove 38 adjacent to the central chamber 37. The central chamber 37 is adapted to house the upper portion of the connector shaft 81. In embodiments where the friction cartridge assembly 300 is utilized, the central chamber 37 will also house the friction cartridge assembly 300. The groove 38 is adapted to receive the first and second projections 715,716 of the adjustable panning insert 700. A stop 39 can be positioned along the groove path of the groove 38. In the embodiment depicted in FIG. 8D, the stop 39 is positioned within the anterior portion 38a of the groove 38 proximate to the anterior side 34a of the lower bracket 34, although in alternative embodiments the stop 39 can be positioned at other locations along the groove path, such as within the posterior portion 38p of the groove 38 proximate to the posterior side 34p of the lower bracket 34. The channel 24 and the groove 38 each may be annular, ring-shaped, oval-shaped, or any other suitable shape to achieve the functions described herein.

In operation, a user can elect the preferred range of side-to-side motion of the support arm 1 by adjusting the orientation of the adjustable panning insert 700 relative to its housing formed in the upper end of the first arm 20. In the embodiment depicted in FIGS. 8A-8B and 8E-8G, the first projection 715 is spaced apart from the second projection 716 along the circumference of the second end 705 by approximately 90° (as measured relative to the center of the adjustable panning insert 700) along the circumference of the adjustable panning insert 700, thereby providing a user three swivel settings: 90°, 180°, and 360° rotation. FIG. 8G is a top view of the adjustable panning insert 700 depicting the first and second projections 715,716 spaced apart by approximately 90°, with the stop 39 being transposed in various positions along the circumference of the adjustable panning insert to show the possible positioning of the adjustable panning insert's projections relative to the stop 39 depending on the orientation of the adjustable panning insert 700 and the horizontal positioning of the arm assembly 20,30.

Figure 8B:
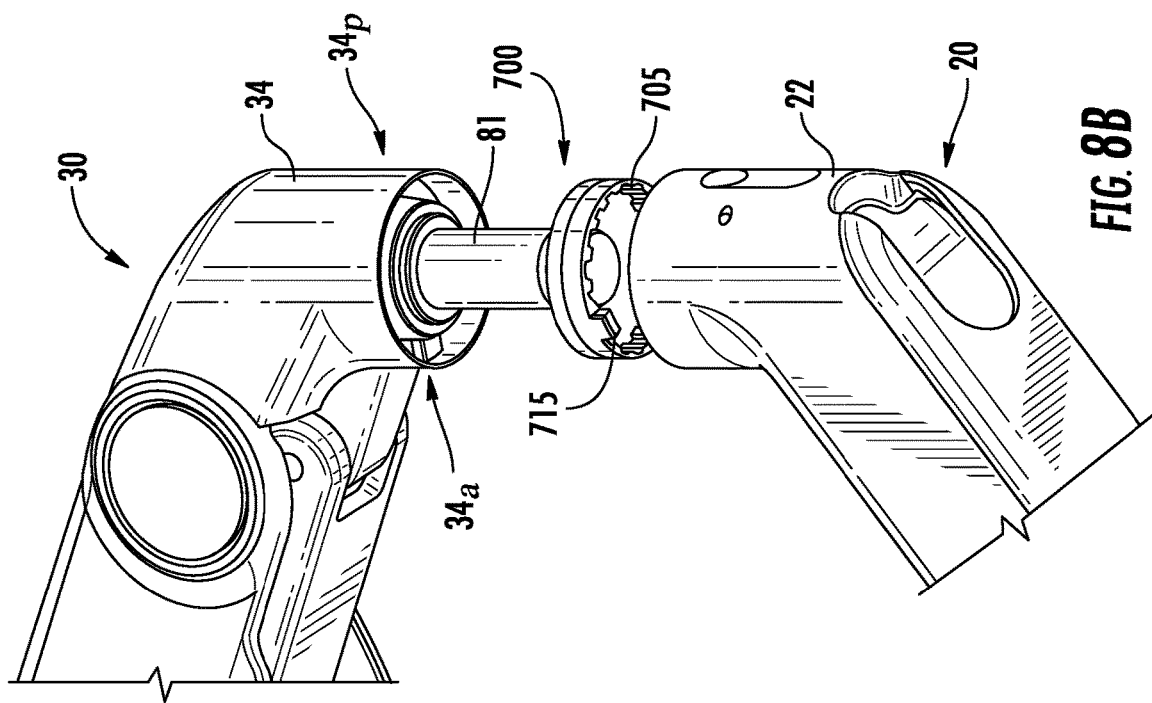
FIG. 8B is a partially exploded, perspective view of the adjustable panning insert shown in FIG. 8A.
Figure 8A:
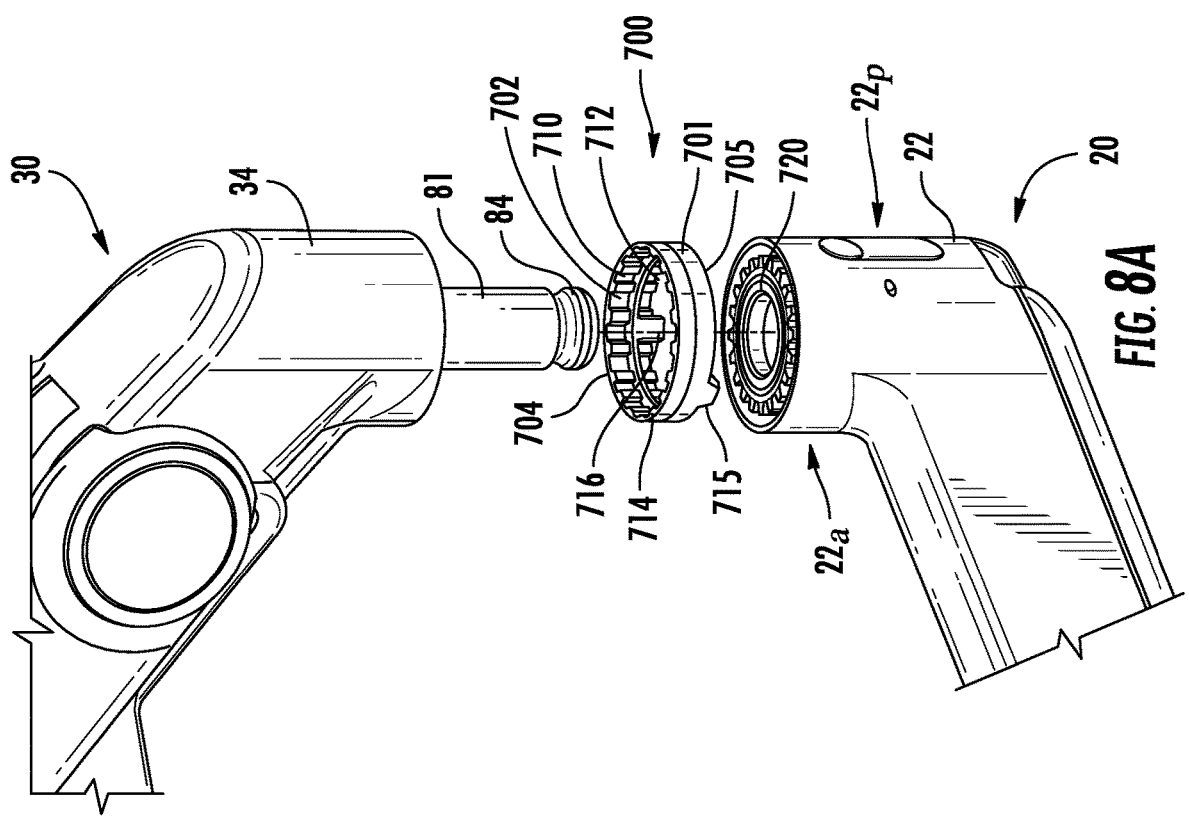
FIG. 8A is a partially exploded, perspective view of an exemplary embodiment of an adjustable panning insert useful for adjusting the side-to-side range of motion of the arm assembly of the adjustable support arm shown in FIG. 1.
Figure 8C:
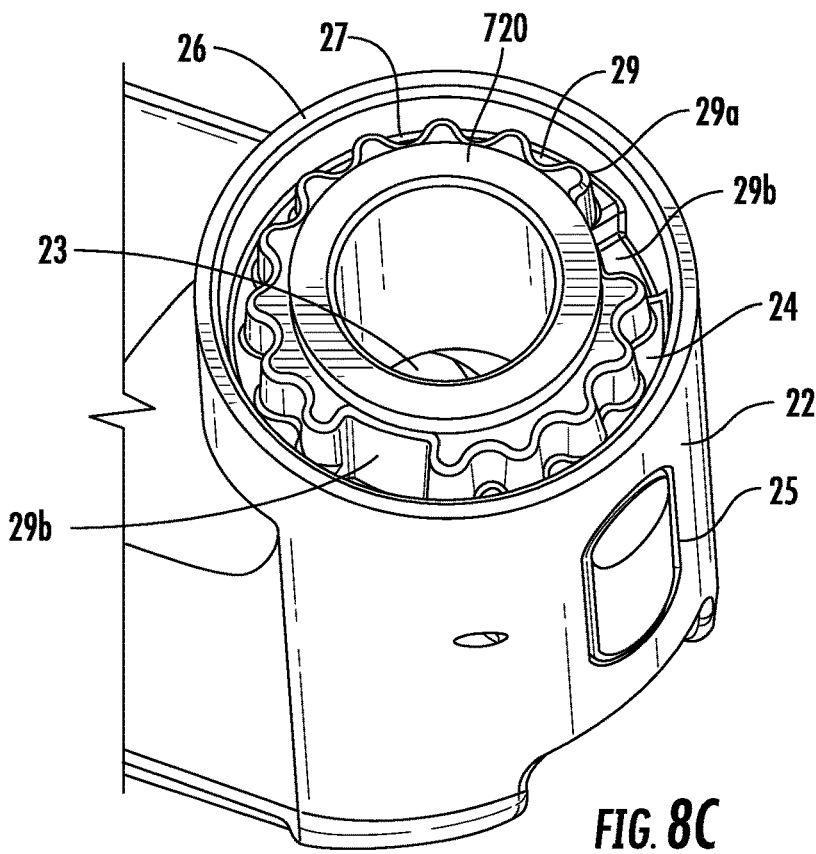
FIG. 8C is a perspective view of an exemplary embodiment of the housing formed in the upper end of the first arm adapted for receiving the adjustable panning insert.
Figure 8D:
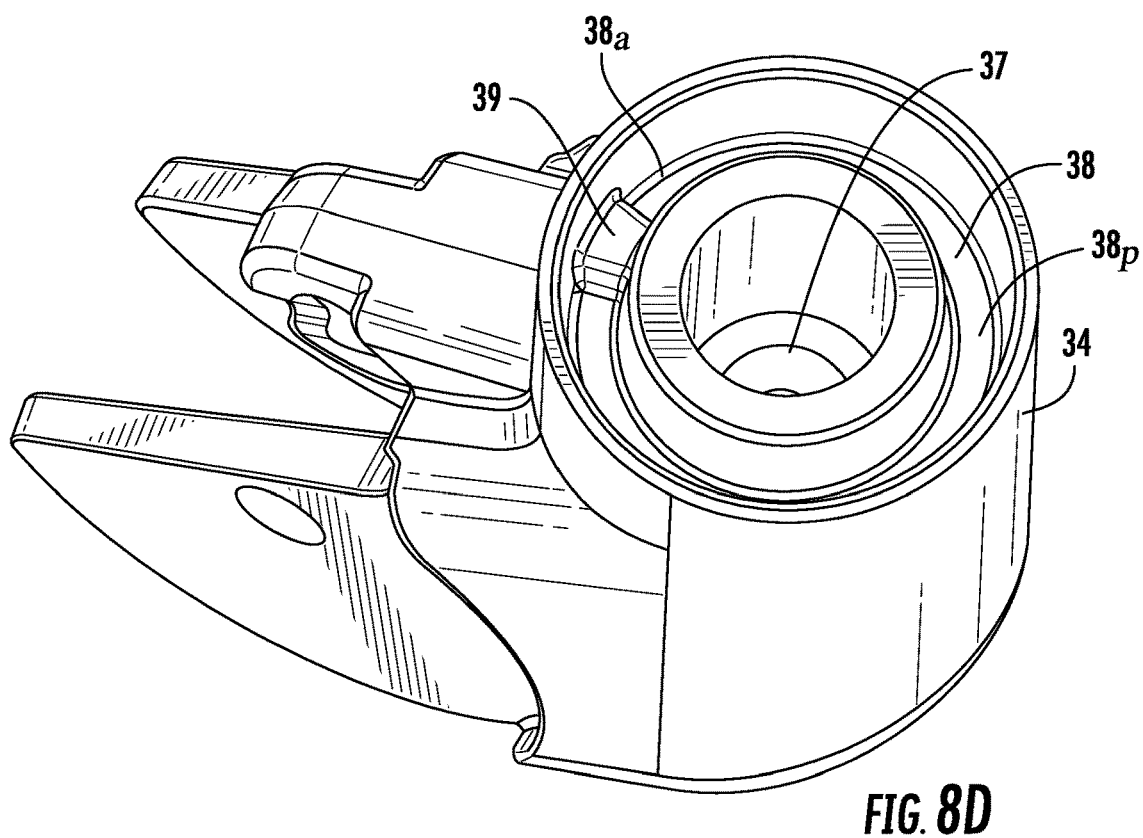
FIG. 8D is a perspective view of an exemplary embodiment of the housing formed in the lower bracket of the second arm adapted for receiving the adjustable panning insert.
Figure 8F:
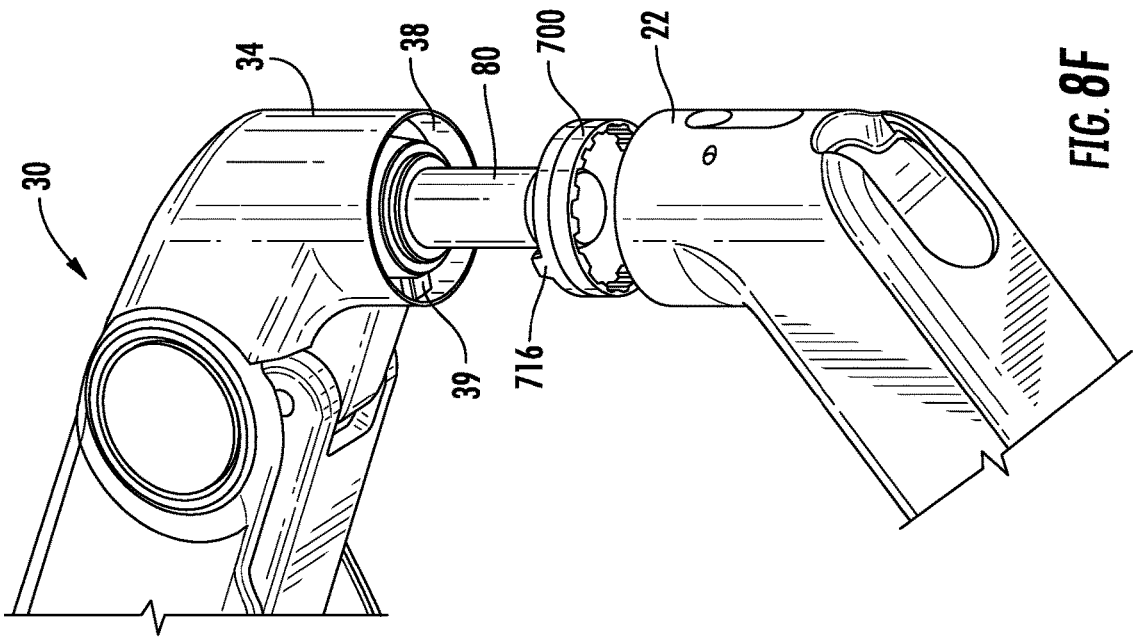
FIG. 8F is a partially exploded, perspective view of the adjustable panning insert shown in FIG. 8A in reverse orientation.
Figure 8E:
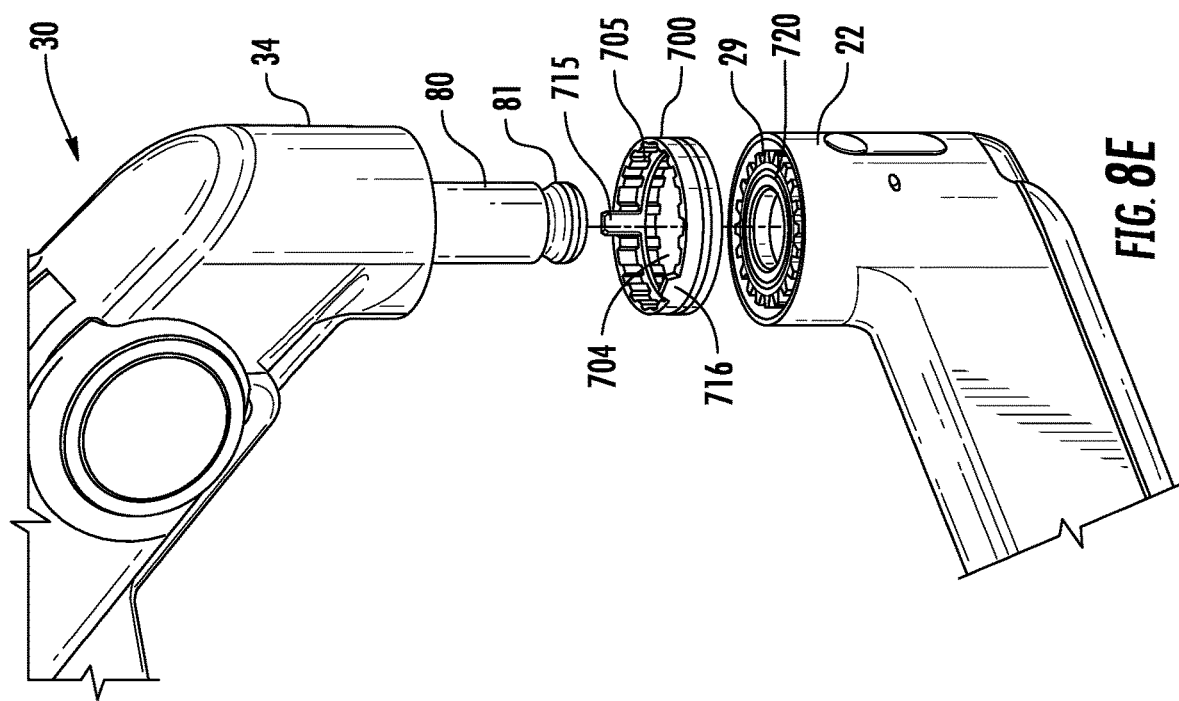
FIG. 8E is a partially exploded, perspective view of the adjustable panning insert shown in FIG. 8A in reverse orientation.
Figure 8G:
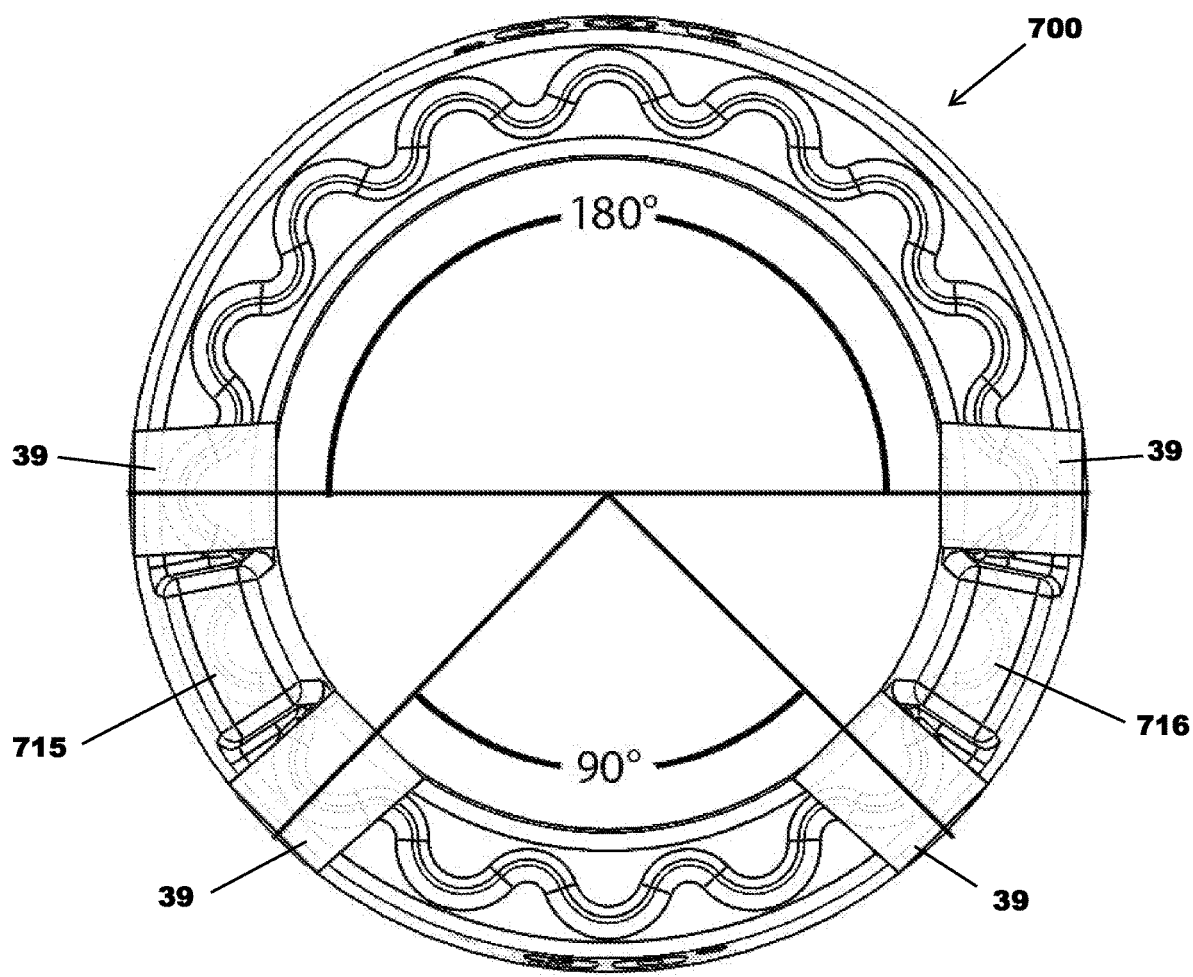
FIG. 8G is a top view of the adjustable panning insert shown in FIG. 8A.

Referring to FIGS. 8A-8B, the adjustable panning insert 700 is positioned in a first orientation which will allow the second arm 30 to rotate 360° relative to the first arm 20. In this first orientation, the second male spline 712 will engage with the female spline 29 formed in the channel 24 of the first arm 20, with the one or more pockets 29b receiving and housing the first and second projections 715,716 of the adjustable panning insert 700. In this arrangement, the first end 704 of the adjustable panning insert 700—which lacks a projection—will not engage the stop 39 in the groove 38 of the second arm's lower bracket 34, thereby allowing 360° rotation. Referring now to FIGS. 8E-8F, the adjustable panning insert 700 is positioned in a second orientation which will only allow the second arm 30 to rotate 90° relative to the first arm 20. In this second orientation, the first male spline 710 will engage with the female spline 29 formed in the channel 24 of the first arm 20, while the first and second projections 715,716 of the adjustable panning insert 700 will protrude into the groove 38 of the second arm's lower bracket 34. In this second orientation, the adjustable panning insert is seated in the housing such that the protrusions are proximate to the anterior side of the base assembly. As the second arm 30 is rotated in a first direction relative to the first arm 20, the stop 39 will engage the first projection 715 after approximately 45° of travel (as measured from a starting position directly facing the user) and prohibit further panning in the first direction. Similarly, as the second arm 30 is rotated in a second direction relative to the first arm 20, the stop 39 will engage the second projection 716 after approximately 45° of travel (as measured from a starting position directly facing the user) and prohibit further panning in the second direction. In a further embodiment, a user may position the adjustable panning insert 700 in a third orientation to allow the second arm 30 to rotate 180° relative to the first arm 20. Starting from the orientation depicted in FIGS. 8E-8F, this third orientation may be achieved by rotating the adjustable panning insert 700 about its central axis 180° in the horizontal (i.e., radial) plane and then re-seating the first male spline 710 into engagement with the female spline 29 of the first arm 20. As the second arm 30 is rotated in a first direction relative to the first arm 20, the stop 39 will engage the first projection 715 after approximately 90° of travel (as measured from a starting position directly facing the user) and prohibit further panning in the first direction. Similarly, as the second arm 30 is rotated in a second direction relative to the first arm 20, the stop 39 will engage the second projection 716 after approximately 90° of travel (as measured from a starting position directly facing the user) and prohibit further panning in the second direction.

The adjustable panning insert 700 may be a ring-shaped, hollow cylinder having an outer wall 701, an inner wall 702, a first end 704, and a second end 705. The adjustable panning insert 700 further defines a radial plane and a longitudinal plane, The inner wall 702 can comprise a first male spline 710 and a second male spline 712 positioned adjacent to one another along the surface of the inner wall 702 and each comprising teeth 714 extending inward from the inner wall 702.

Whereas, in the embodiments depicted in FIGS. 8A-8G, the adjustable panning insert 700 is shown having first and second male splines 710,712 positioned along the inner wall 702, in alternative embodiments the first and second male splines 710,712 may be positioned along the outer wall of the adjustable panning insert 700. In such alternative embodiments, the female spline 29 would be positioned along the inner periphery of the outer wall 26 such that the teeth 29a extend laterally from the outer wall 26 and partially into the channel 24 for mating with either the first or second male splines 710,712 of the adjustable panning insert 700. In further alternative embodiments, the first and second male splines 710,712 may be replaced with one or more projections, while the female spline 29 may be replaced with one or more slots adapted to mate with the one or more projections. While the foregoing description illustrates the adjustable panning insert functionality using splines, projections, and pockets, any other acceptable means or mechanism for temporarily mating the panning insert 700 with the groove 38 can be used, including but not limited to the following: a ratchet and pawl; a rack and pinion or other mating gears; one or more pins mated to one or more holes, etc.

Referring still to FIGS. 8A-8F, certain embodiments of the adjustable support arm may utilize a bearing 720 positioned adjacent to the inner wall 27 of the channel 24 formed in the second end 22 of the first arm 20. The bearing 720 functions to operatively engage the connector shaft 81 to reduce the amount of force required to adjust the horizontal (i.e., side-to-side) positioning of the second arm 30. In one exemplary embodiment, the bearing 720 is an angular contact bearing having inner and outer ring raceways that are displaced relative to each other in the direction of the bearing axis, thereby simultaneously accommodating radial and axial loads. However, other bearing types may be utilized.

Referring now to FIGS. 9A-9C and 13B, the mounting plate 44 of articulating joint 40 can comprise a fastening mechanism for easy removal and attachment of a mounted accessory or accessory adapter (e.g., an electronic display, keyboard, paper holder, laptop holder, tablet holder, phone holder, light, or other object) to the support arm 1. In FIGS. 9A-9C and 13B, an exemplary embodiment of the accessory fastening mechanism 400 is depicted. The accessory fastening mechanism 400 can comprise spring-loaded latch 410 and a hook 420. In one exemplary embodiment, the spring-loaded latch 410 can comprise a clasp 412 and a button 414, with the clasp 412 protruding from the front side of the mounting plate 44 and the button 414 protruding from the rear side of the mounting plate 44. A spring 411 (see FIG. 13B) may be positioned within the a cavity formed in the mounting plate 44 and may operatively engage the spring-loaded latch 410 to bias it downward relative to the center of the mounting plate 44. In the exemplary embodiment depicted in FIGS. 9A-9C and 13B, the spring-loaded latch 410 is positioned within a cut-out 46 formed in the lower portion 45 of the mounting plate 44, and the hook 420 protrudes from the front side of the upper portion 47 of the mounting plate 44. In alternative embodiments, the spring-loaded latch 410 can be attached at various portions of the mounting plate 44, including but not limited to the upper portion 47 of the mounting plate 44, while the hook 420 can be attached at various positions of the mounting plate 44, including but not limited to the lower portion 45 of the mounting plate 44. A person of ordinary skill in the art would appreciate that the locations of the latch and hook can vary, and multiple latches and hooks can be used, to allow for the quick release function described herein. Further, the hook(s) and latch(es) can be of any suitable shape to achieve the intended function described herein.

In operation, a user can utilize the accessory fastening mechanism 400 to selectively remove and re-attach the accessory bracket assembly 50 to the mounting plate 44 of the articulating joint 40. To attach the accessory bracket assembly 50, a user may first couple the hook 420 to the upper portion of the central bracket 51 by tilting the bracket's upper portion towards the bracket assembly 50 and extending the hook 420 into the upper opening 53 of the central bracket 51. Next, the user may bring the lower portion of the central bracket 51 into a position adjacent the spring-loaded latch 410 and may or may not lift the spring loaded latch 410 by lifting up on the button 414. Then, the user can bring the lower portion of the central bracket 51 into a position adjacent the lower portion of the mounting plate 44, which will cause the clasp 412 to extend into the lower opening 52 of the central bracket 51. If the user lifted the spring loaded latch 410, upon releasing the button 414, the clasp 412 can engage the lower portion of the central bracket 51 to secure the accessory bracket assembly 50 to the mounting plate 44. If the user did not lift the spring loaded latch 410, the clasp 412 will be forced to accommodate the lower opening 52 of the central bracket 51 through compression of the spring 411. To remove the accessory bracket assembly 50, the user can reverse the foregoing process. Specifically, the user can lift up on the button 414 and disengage the clasp 412 from the lower portion of the central bracket 51. The user can then detach the hook 420 to the upper portion of the central bracket 51.

Referring now to FIGS. 10A-10B, an exemplary embodiment of an accessory bracket assembly 50 having mounts or mounting pieces for attaching secondary accessories to the adjustable support arm 1 is shown. The accessory bracket assembly 50 can comprise any combination of a top mount 510, a right mount 520, a bottom mount 530, and a left mount 540 each attached to the frame 57 of the accessory bracket assembly 50. The mounts or mounting pieces may be tubular in shape or of any other suitable shape to achieve the functions described herein. The accessories that couple with the mounts or mounting pieces can either couple directly or indirectly to the mounts via temporary fasteners. A first accessory support 575 can be coupled to the top and bottom mounts 510,530, while a second accessory support 576 can be coupled to the right and left mounts 520,540. The first and second accessory supports 575,576 may comprise U-shaped tubing with diameters slightly smaller than the inner diameter of the tubular mounts, thus allowing the first and second accessory supports 575,576 to be coupled to the mounts 510,520,530,540 by sliding the ends of the first and second accessory supports 575,576 into the hollow openings of the mounts. In alternative embodiments, the accessory supports 575,576 can be linear tubing (e.g., see FIGS. 10C-10E) or any other shaped body capable of coupling to the mounts 510,520,530,540. Secondary accessories, such as paper holders, lights, electronic displays, keyboards, laptop holders, tablet holders, phone holders, and other accessories can then be attached to the accessory supports 575,576 using fasteners or brackets known in the art.

Figure 10C:
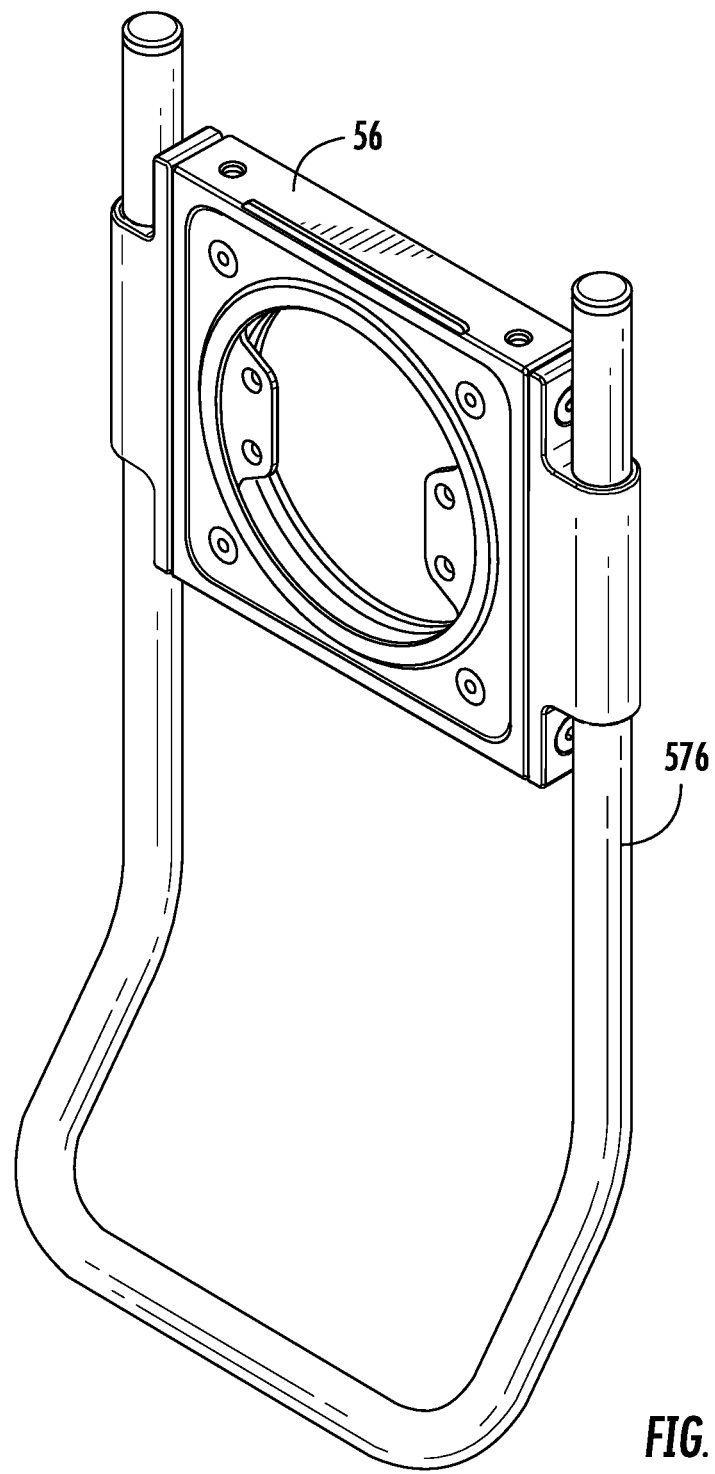
FIG. 10C is a perspective view of an alternative embodiment of the accessory bracket assembly.
Figure 10D:
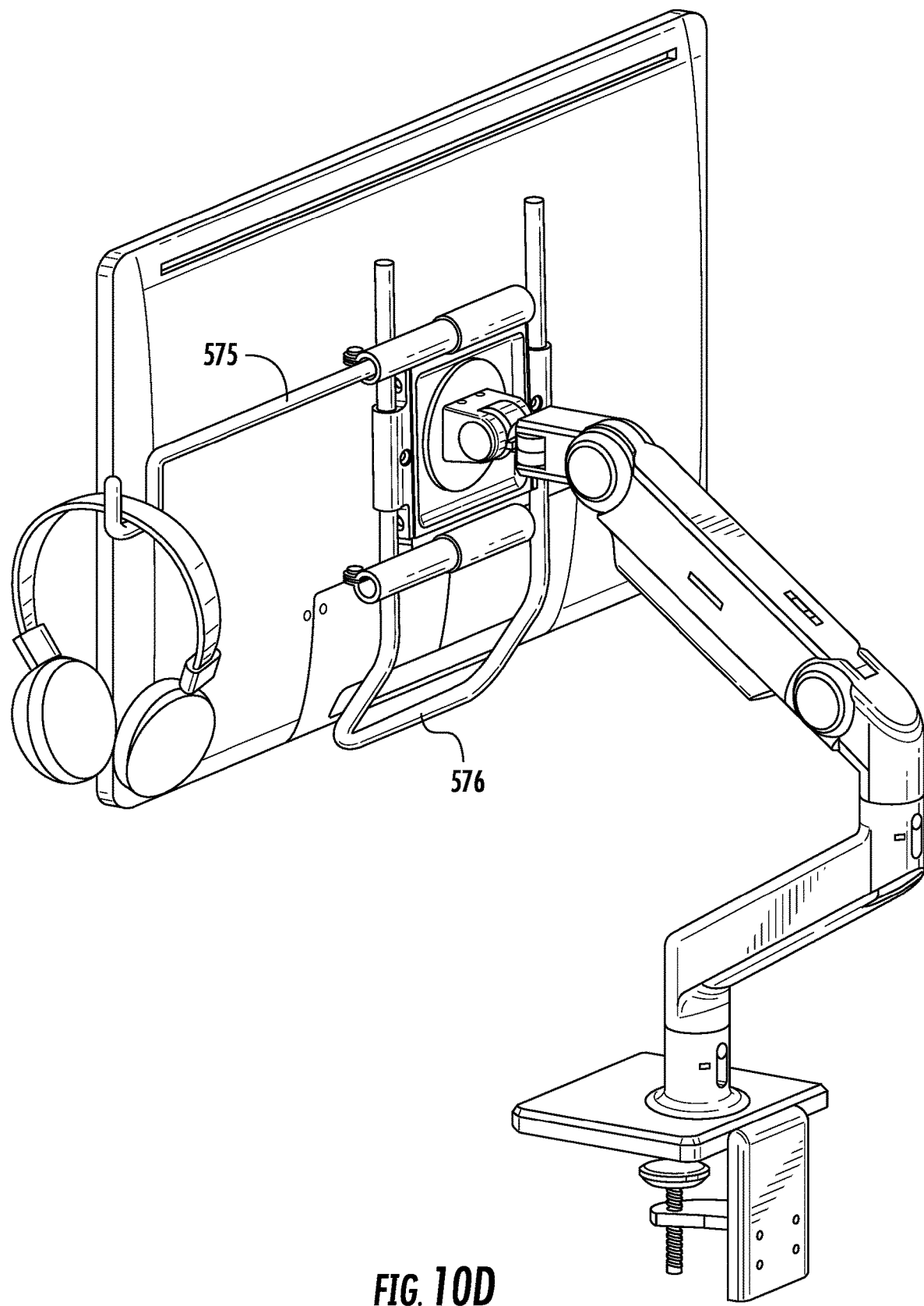
FIG. 10D is a perspective view of an alternative embodiment of the accessory bracket assembly.
Figure 10E:
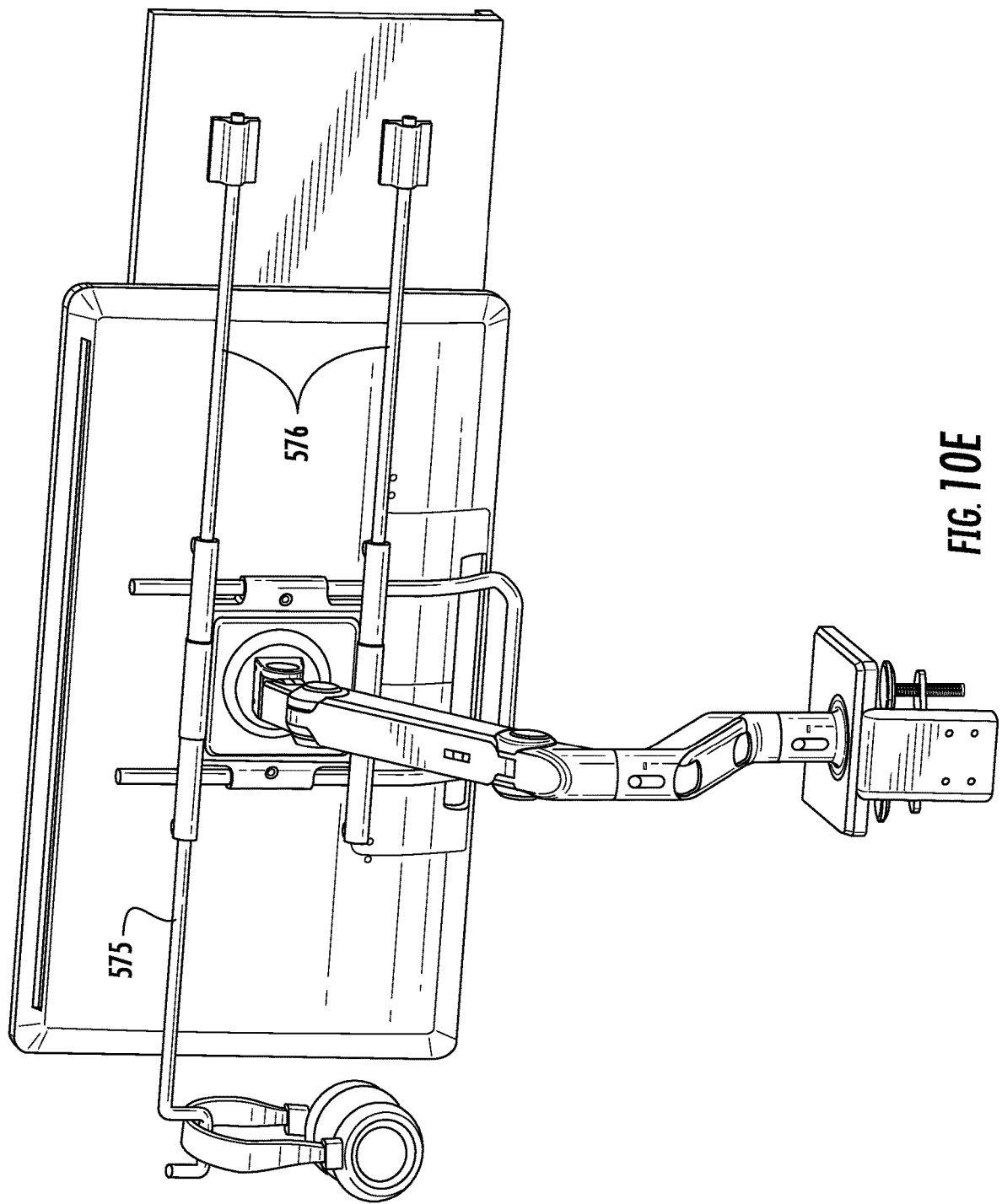
FIG. 10E is a perspective view of an alternative embodiment of the accessory bracket assembly.

Alternative embodiments showing a variety of exemplary accessory support configurations are depicted in FIGS. 10C-10E such as a handle, an earphone or headset holder or mount, and a side panel, tablet holder, or paper tray holder.

Figure 11A:
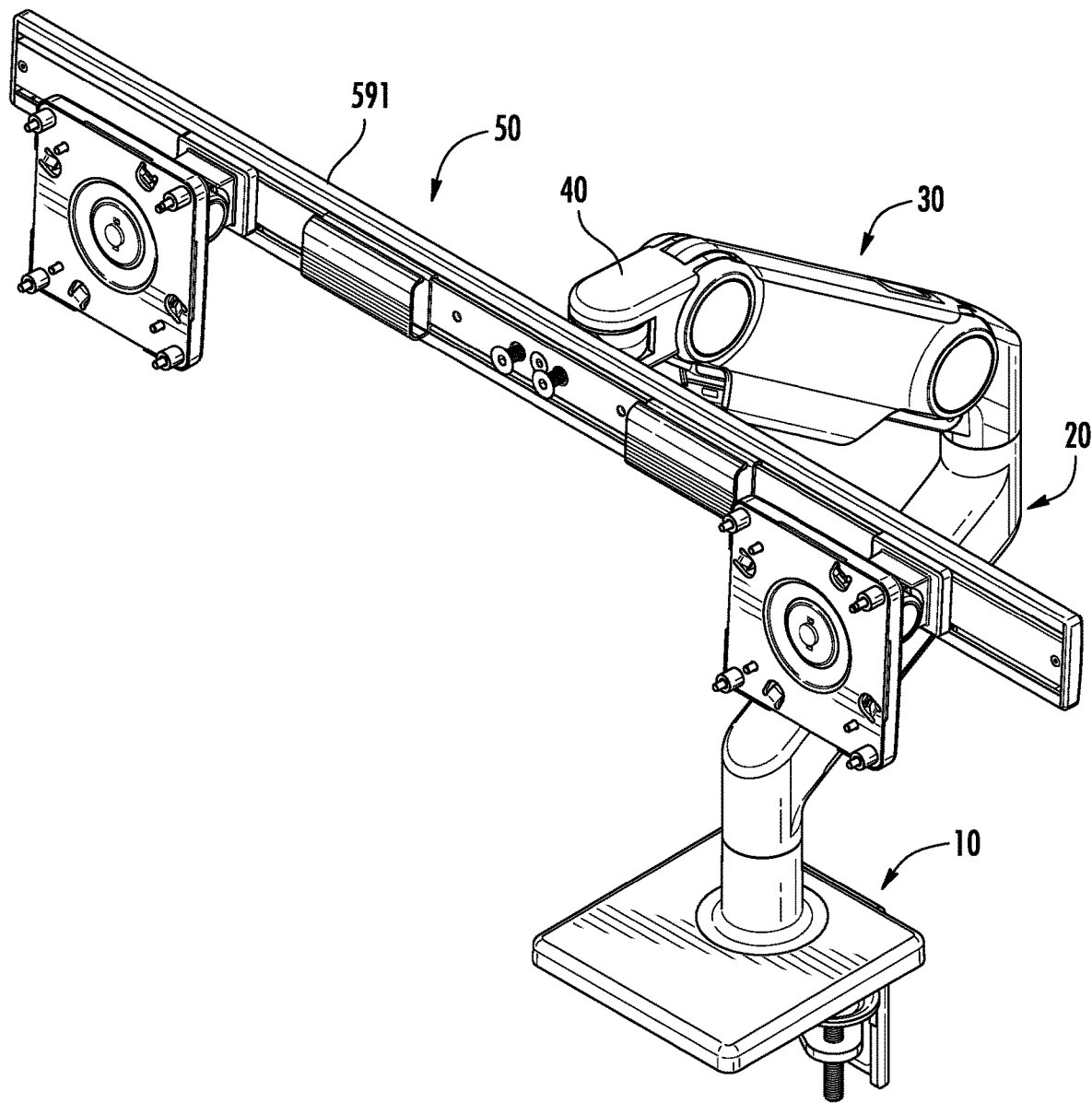
FIG. 11A is a perspective view of the exemplary adjustable support arm shown in FIG. 1 but with an alternative embodiment of the accessory bracket assembly comprising a horizontal crossbar.
Figure 11B:
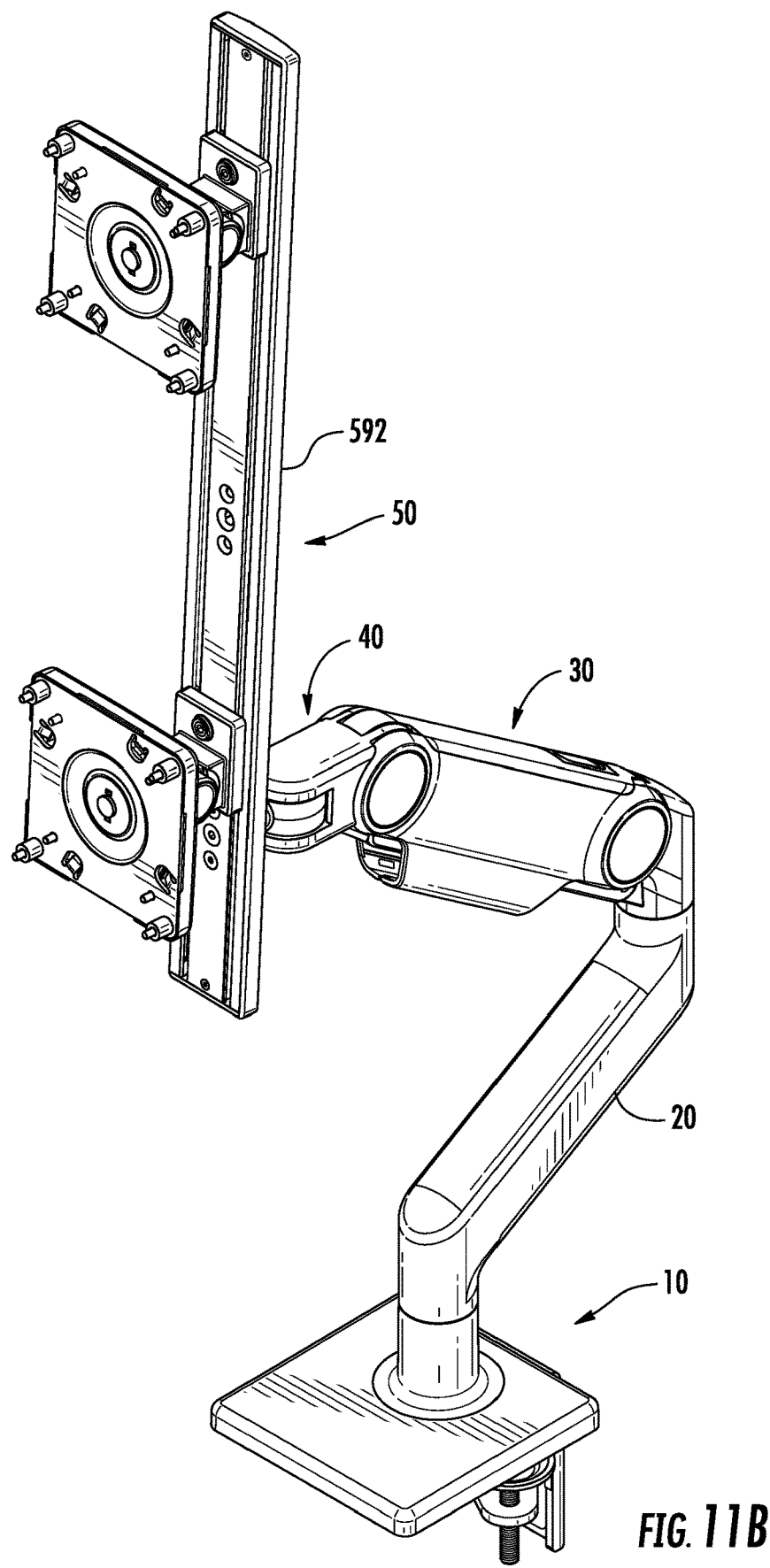
FIG. 11B is a perspective view of the exemplary adjustable support arm shown in FIG. 1 but with an alternative embodiment of the accessory bracket assembly comprising a vertical crossbar.
Figure 11C:
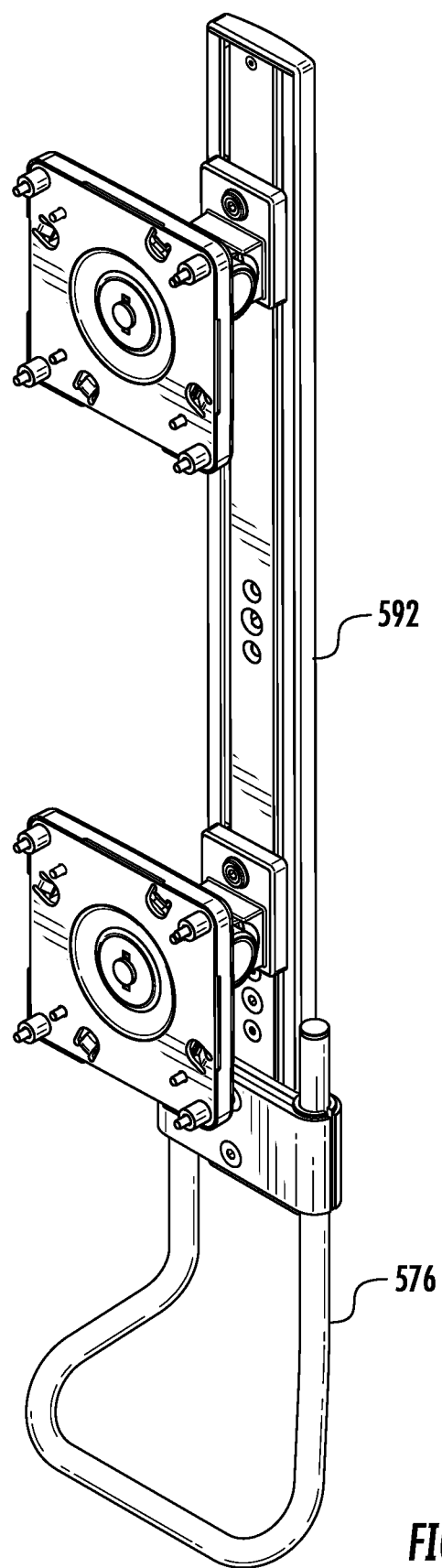
FIG. 11C is a perspective view of the exemplary adjustable support arm shown in FIG. 1 but with an alternative embodiment of the accessory bracket assembly comprising a vertical crossbar and a second accessory support mounted thereto.

Referring now to FIGS. 11A-11C, alternative embodiments of the accessory bracket assembly are depicted. As shown in FIG. 11A, the accessory bracket assembly 50 may comprise a horizontal crossbar assembly 591 attached to the joint 40. As shown in FIG. 11B, the accessory bracket assembly 50 may comprise a vertical crossbar assembly 592 attached to the joint 40. As shown in FIG. 11C, one or more accessory supports 575,576 may be attached to either the horizontal or vertical crossbar assemblies 591, 592 at the sides, top, or bottom, as applicable given the crossbar configuration.

Many modifications and other embodiments of the inventions set forth herein will come to mind to one skilled in the art to which these inventions pertain having the benefit of the teaching presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An adjustable support arm comprising:
   a) a base assembly;
   b) an arm assembly;
   c) an adjustable panning insert positioned between the arm assembly and the base assembly, wherein the adjustable panning insert comprises first and second projections extending from a second end of the adjustable panning insert, wherein the first projection is spaced apart from the second projection; and
   d) a quick-release joint for releasably connecting the arm assembly to the base assembly.

2. The adjustable support arm of claim 1, wherein the quick-release joint comprises:
   i) a latch;
   ii) an axle extending through an aperture formed in the latch to pivotally connect the latch to the base assembly, the axle defining a fulcrum about which the latch pivots;
   iii) a spring for biasing the latch into engagement with a connector shaft.

3. The adjustable support arm of claim 2, wherein the base assembly comprises a housing adapted to receive the adjustable panning insert.

4. The adjustable support arm of claim 3, wherein the base assembly further comprises a bearing positioned within the housing of the base assembly and operatively engaging the connector shaft.

5. The adjustable support arm of claim 3, wherein the adjustable panning insert comprises: first and second splines positioned in a stacked orientation around an inner wall of the adjustable panning insert.

6. The adjustable support arm of claim 5, wherein the housing of the base assembly further comprises a third spline for mating with either the first or second splines of the adjustable panning insert.

7. The adjustable support arm of claim 5, wherein the housing of the base assembly further comprises a third spline for mating with either the first or second splines of the adjustable panning insert.

8. The adjustable support arm of claim 5, wherein the first projection is spaced apart from the second projection along a circumference of the second end of the adjustable panning insert by approximately 90° as measured in a first direction along the circumference.

9. The adjustable support arm of claim 1, wherein the arm assembly comprises:
   a) a central chamber;
   b) a groove adjacent to the central chamber; and
   c) a stop positioned within the groove.

10. The adjustable support arm of claim 9, wherein the arm assembly comprises a dynamic arm, wherein the dynamic arm comprises a parallelogram linkage having a first end pivotally attached to a lower bracket and a second end pivotally attached to an upper bracket.

11. The adjustable support arm of claim 1, wherein the adjustable support arm further comprises a mounting plate connected to the arm assembly.

12. The adjustable support arm of claim 11, wherein the adjustable support arm further comprises an accessory bracket assembly releasably attached to the mounting plate.

13. The adjustable support arm of claim 12, wherein the accessory bracket assembly comprises: a central bracket; a frame disposed around the central bracket; and at least one accessory mount attached to the frame.

14. The adjustable support arm of claim 13, wherein the accessory bracket assembly further comprises a first accessory support having a first end coupled to the accessory mount.

15. The adjustable support arm of claim 1, wherein the adjustable support arm further comprises an articulating joint connected to the arm assembly, the articulating joint comprising:
   a) a swivel ring pivotally attached to the arm assembly;
   b) a tilt ring attached to the swivel ring; and
   c) a mounting plate pivotally attached to the tilt ring.

16. The adjustable support arm of claim 15, wherein the mounting plate further comprises a fastening mechanism, the fastening mechanism comprising: a spring-loaded latch; and a hook protruding from a front side of the mounting plate.

17. An adjustable support arm comprising:
   a) a base assembly;
   b) an arm assembly comprising: (i) a first arm comprising a first end and a second end, wherein the first end of the first arm is releasably coupled to the base assembly; (ii) a second arm releasably coupled to the second end of the first arm, the second arm comprising a parallelogram linkage having a first end pivotally attached to a lower bracket and a second end pivotally attached to an upper bracket;
   c) a first adjustable panning insert, wherein the first adjustable panning insert is positioned between the first arm and the base assembly to limit rotation of the first arm about the base assembly; and
   d) a first quick-release joint, wherein the first quick-release joint releasably connects the first arm to the base assembly.

18. The adjustable support arm of claim 17, wherein the quick-release joint comprises:
   i) a latch;
   ii) an axle extending through an aperture formed in the latch to pivotally connect the latch to the base assembly, the axle defining a fulcrum about which the latch pivots;
   iii) a spring for biasing the latch into engagement with a connector shaft.

19. The adjustable support arm of claim 17, wherein the adjustable support arm further comprises: a second adjustable panning insert positioned between the second arm and the first arm to limit rotation of the second arm about the first arm; and a second quick-release joint releasably connecting the second arm to the first arm.

20. The adjustable support arm of claim 17, wherein the first and second adjustable panning inserts each comprise: first and second splines positioned in a stacked orientation around an inner wall of the adjustable panning insert; and first and second projections extending from a second end of the adjustable panning insert, wherein the first projection is spaced apart from the second projection.

\* \* \* \* \*